(12) United States Patent
Shimogawa

(10) Patent No.: US 9,348,630 B2
(45) Date of Patent: May 24, 2016

(54) VIRTUAL MACHINE CONTROL PROGRAM IN A CLOUD COMPUTING ENVIRONMENT, VIRTUAL MACHINE CONTROL METHOD IN A CLOUD COMPUTING ENVIRONMENT, VIRTUAL MACHINE CONTROL APPARATUS, AND CLOUD COMPUTING SYSTEM

(71) Applicant: FUJITSU LIMITED, Kawasaki-shi, Kanagawa (JP)

(72) Inventor: Kenichirou Shimogawa, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 191 days.

(21) Appl. No.: 14/188,731

(22) Filed: Feb. 25, 2014

(65) Prior Publication Data

US 2014/0298331 A1 Oct. 2, 2014

(30) Foreign Application Priority Data

Mar. 28, 2013 (JP) .................................. 2013-069214

(51) Int. Cl.
G06F 9/455 (2006.01)

(52) U.S. Cl.
CPC .................................. G06F 9/45533 (2013.01)

(58) Field of Classification Search
CPC .. G06F 9/45533; G06F 9/485; G06F 9/45575
USPC .............................................. 718/1, 100–108
See application file for complete search history.

(56) References Cited

U.S. PATENT DOCUMENTS

| | | | | |
|---|---|---|---|---|
| 4,395,757 A * | 7/1983 | Bienvenu | .................. | G06F 9/52 718/104 |
| 6,195,676 B1 * | 2/2001 | Spix | ......................... | G06F 8/41 711/E12.006 |
| 6,298,370 B1 * | 10/2001 | Tang | ..................... | G06F 9/5044 718/100 |
| 7,228,547 B2 * | 6/2007 | Yaung | .................. | G06Q 30/018 705/317 |
| 7,263,700 B1 * | 8/2007 | Bacon | ..................... | G06F 9/445 707/999.202 |

(Continued)

FOREIGN PATENT DOCUMENTS

JP 2007-272297 A 10/2007
JP 2010-224914 A 10/2010

OTHER PUBLICATIONS

Mazmanov et al, "Handling Performance Sensitive Native Cloud Applications with Distributed Cloud Computing and SLA Management", IEEE, pp. 470-475, 2013.*

(Continued)

*Primary Examiner* — Anil Khatri
(74) *Attorney, Agent, or Firm* — Fujitsu Patent Center

(57) ABSTRACT

A virtual machine management program causes a computer to execute a process. The process includes suspending a virtual machine, when an access to the virtual machine does not occur for a first time, resuming and, after a second time elapses, suspending the virtual machine being suspended, even the access to the virtual machine does not occur, so as to cause the virtual machine to perform a refreshing process, and resuming the virtual machine being suspended, when the access to the virtual machine occurs.

14 Claims, 21 Drawing Sheets

(56) References Cited

U.S. PATENT DOCUMENTS

| | | | | |
|---|---|---|---|---|
| 7,685,599 | B2* | 3/2010 | Kanai | G06F 9/4881 370/395.4 |
| 7,716,667 | B2* | 5/2010 | van Rietschote | G06F 9/45533 718/1 |
| 8,176,486 | B2* | 5/2012 | Amir Husain | G06F 9/445 709/223 |
| 8,230,420 | B2* | 7/2012 | Ishikawa | G06F 9/45504 718/1 |
| 8,307,362 | B1* | 11/2012 | Gong | G06F 9/5077 718/1 |
| 8,365,180 | B2* | 1/2013 | Kawasaki | G06F 9/45516 718/1 |
| 8,370,473 | B2* | 2/2013 | Glikson | G06F 9/4856 709/223 |
| 8,407,702 | B2* | 3/2013 | Ikegaya | G06F 9/455 718/1 |
| 8,473,594 | B2* | 6/2013 | Astete | G06F 9/45533 709/223 |
| 8,621,066 | B2* | 12/2013 | Purdy | G06F 17/30038 709/203 |
| 8,635,395 | B2* | 1/2014 | Colbert | G06F 9/45558 711/6 |
| 8,789,043 | B2* | 7/2014 | Biran | G06F 9/45558 718/1 |
| 8,924,534 | B2* | 12/2014 | Suri | G06F 9/4856 370/254 |

OTHER PUBLICATIONS

Akande et al, "Management Issues with Cloud Computing", ACM, pp. 119-124, 2013.*
Das et al, "Improving Total Migration Time in Live Virtual Machine Migration", ACM, pp. 1-5, 2015.*
Sotomayor et al, "Combining Batch Execution and Leasing Using Virtual Machines", ACM, pp. 87-96, 2008.*
Chandramouli et al, "Query Suspend and Resume", ACM, pp. 557-568, 2007.*
Stomayor et al, "Resource Leasing and the Art of Suspending Virtual Machines", IEEE International Conference on High Performance Computing and Communications, pp. 59-68, 2009.*

* cited by examiner

FIG. 10 ACCESS MONITORING AND SUSPEND CONTROL BY MANAGEMENT SERVER

FIG. 13 OPERATION INFORMATION ACQUISITION FROM VIRTUAL MACHINE

FIG. 19

VIRTUAL MACHINE MANAGEMENT TABLE

| ITEM | vmname | ipaddr | wait-screen |
|---|---|---|---|
| EXPLANATION | VIRTUAL MACHINE NAME | IP ADDRESS | WAIT SCREEN DATA |
| STORAGE EXAMPLE | vm001 | 1.2.3.4 | vm001.html |
| | vm002 | 1.2.3.5 | vm002.html |
| | vm003 | 1.2.3.6 | vm003.html |

FIG. 20

VIRTUAL MACHINE OPERATION INFORMATION TABLE

| ITEM | vmname | IO count, IO time | | | | | |
|---|---|---|---|---|---|---|---|
| EXPLA-NATION | vm NAME | IO COUNT FOR AND IO CONTINUATION TIME IN EVERY HOUR | | | | | |
| | TIME (H:M) | 00:00 | 01:00 | 02:00 | ......... | 09:00 | ......... |
| STORAGE EXAMPLE | vm001 | 150<br>5min | 500<br>10min | 0<br>0 | 0<br>0 | 0<br>0 | 0<br>0 |
| | vm002 | 0<br>0 | 0<br>0 | 0<br>0 | 0<br>0 | 800<br>20Min | 0<br>0 |
| | vm003 | 0<br>0 | 0<br>0 | 0<br>0 | 0<br>0 | 0<br>0 | 0<br>0 |

VIRTUAL MACHINE CONTROL PROGRAM IN A CLOUD COMPUTING ENVIRONMENT, VIRTUAL MACHINE CONTROL METHOD IN A CLOUD COMPUTING ENVIRONMENT, VIRTUAL MACHINE CONTROL APPARATUS, AND CLOUD COMPUTING SYSTEM

CROSS-REFERENCE TO RELATED APPLICATION

This application is based upon and claims the benefit of priority of the prior Japanese Patent Application No. 2013-069214, filed on Mar. 28, 2013, the entire contents of which are incorporated herein by reference.

FIELD

The present invention relates to a virtual machine control program, a virtual machine control method, a virtual machine control apparatus, and a cloud computing system.

BACKGROUND

A cloud computing service virtualizes, on the basis of a service contract with a cloud user of the cloud computing service, a hardware group including a plurality of servers in a server facility and provides the cloud user with infrastructures itself such as virtual machines and networks of the hardware group as a service provided through a network.

As types of charging of the cloud computing service, in general, there are monthly charging and meter rate charging. The monthly charging is a contract form for billing a fixed monthly rate to the cloud user. The cloud user is charged with a fixed rate irrespective of whether the cloud user operated the virtual machine. For example, when the cloud user provides a Web service with the virtual machine in the server facility, since it is unknown when the virtual machine is accessed, the cloud user needs to always keep a server of the virtual machine in a started state. Therefore, the cloud user selects the monthly charging.

On the other hand, in the meter rate charging, the cloud user is charged with a rate according to time during which the cloud user operates the virtual machine. The cloud user operates the server of the virtual machine when the server is necessary, for example, when the cloud user operates the virtual machine only to perform monthly processing in the month end, and the cloud user stop the server when the server is unnecessary. In this case, the cloud user selects the meter rate charging.

The cloud computing service is described in Japanese Patent Application Laid-open No. 2010-224914.

SUMMARY

However, even when a frequency of use of a provided Web service by a client is low and therefore a frequency of use of a server of a virtual machine is low, when it is unpredictable when an access occurs as in the Web service explained above, it is necessary to always keep the server started. Therefore, the cloud user has to select the contract of the monthly charging. On the other hand, a cloud computing service provider has a duty to always keep the server in a state in which the server can provide the cloud user having the monthly charging contract with the Web service. Therefore, the monthly charging contract sometimes prevents improvement of efficiency of use of the hardware in the server facility.

One aspect of disclosed embodiments is a non-transitory computer readable medium that stores therein a virtual machine management program for causing a computer to execute a process having suspending a virtual machine, when an access to the virtual machine does not occur for a first time, resuming and, after a second time elapses, suspending the virtual machine being suspended, even the access to the virtual machine does not occur, so as to cause the virtual machine to perform a refreshing process, and resuming the virtual machine being suspended, when the access to the virtual machine occurs.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 19 is a diagram depicting an example of the virtual machine management table.

FIG. 20 is a diagram depicting an example of the virtual machine operation information table.

DESCRIPTION OF EMBODIMENTS

Configuration of a Cloud Computing System

Figure 1:
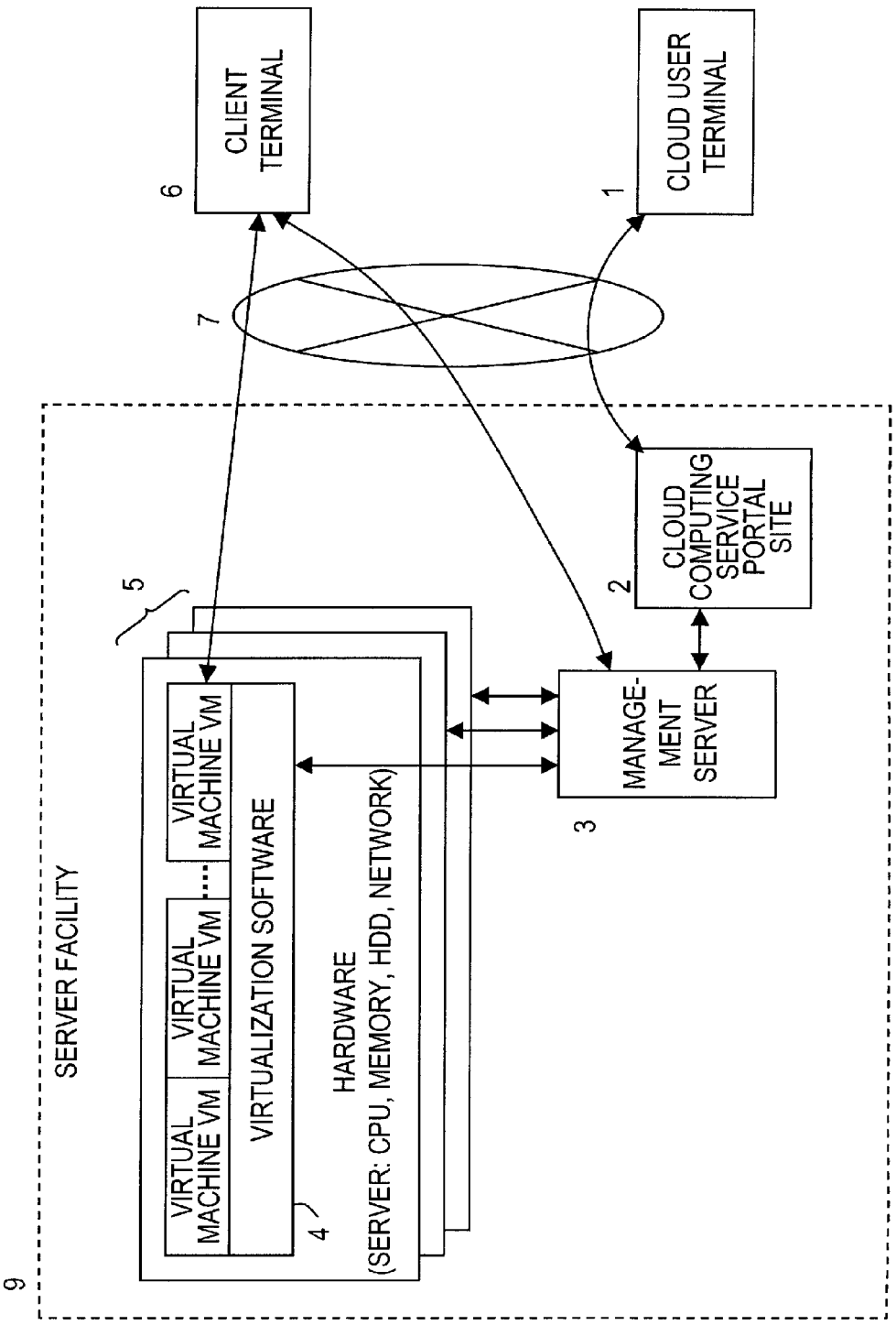
FIG. 1 is a diagram depicting the overall configuration of a cloud computing system in an embodiment.

FIG. 1 is a diagram depicting the overall configuration of a cloud computing system in an embodiment. A hardware group 5, a cloud computing service portal site 2, and a management server 3 are provided in a server facility 9. A cloud user terminal 1 and a client terminal of a client who uses a service provided by the cloud user are connectable to the server facility 9 via a network 7 such as the Internet or an intranet.

The hardware group 5 includes a plurality of servers. Each of the servers includes a CPU, memory (DRAM), a large capacity memory such as a hard disk (HDD), and a network. Resources of the hardware group 5 are allocated to a plurality of virtual machines VM. The cloud computing service portal site 2 and the management server 3 may be generated by, for example, the virtual machines VM.

A cloud computing service provided to the cloud user by the cloud computing system is a service for providing, through the network 7, bases for generating and operating a computer system, that is, infrastructures such as virtual machines and a network.

The cloud user accesses the cloud computing service portal site 2 from a terminal 1 of the cloud user, selects specifications necessary for the virtual machine VM such as CPU clock frequency, memory capacity (GB), hard disk capacity (MB/sec. IOPS), and network bandwidth (Gbps), selects monthly charging or meter rate charging, and enters into a cloud use contract concerning the charging. The cloud user terminal 1 accesses the cloud computing service portal site 2, monitors an operation state of the virtual machine VM, and manipulates the operation of the virtual machine VM.

The management server 3 manages the servers and the like in the hardware group 5, allocates the hardware to the virtual machines VM, and generates and manages the virtual machines VM in cooperation with virtualization software (hypervisor) 4.

The virtualization software 4 is basic software for allocating, according to an instruction from the management server 3, the CPUs, the memories, the hard disks, and the networks of the hardware group 5 to cause the virtual machines VM to operate. The virtualization software 4 operates on, for example, the servers in the hardware group 5.

In addition to the allocation of the hardware, the virtual machine VM has, in the hard disk thereof, an image file including an OS, middleware MW, an application AP, and a database DB. For example, the virtual machine VM writes the Image file from the hard disk into the memory during start and performs an operation corresponding to a desired service.

A client terminal 6 is a terminal of a client who receives provision of a service managed by the cloud user. The client terminal 6 accesses the virtual machine VM of the cloud user via the network 7 and receives provision of a service managed by the cloud user. The client terminal 6 also accesses the virtual machine VM via an access to the management server 3. For example, when the virtual machine VM is in a suspend state, the client terminal 6 accesses the virtual machine VM through the management server 3.

Figure 2:
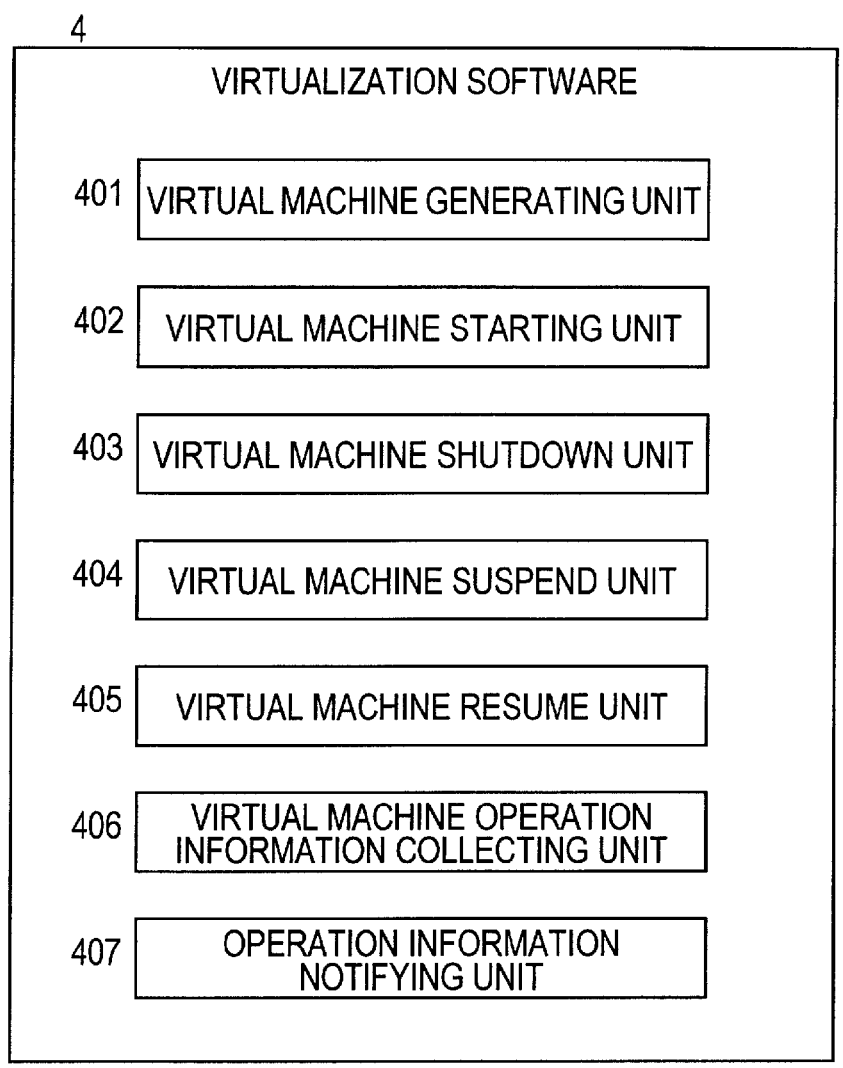
FIG. 2 is a diagram depicting an example of functions of the virtualization software when a virtual machine executes the virtualization software.

FIG. 2 is a diagram depicting an example of functions of the virtualization software when a virtual machine executes the virtualization software. The virtualization software 4 allocates the resources of the hardware group 5 to the virtual machines VM to cause the virtual machines VM to operate. Therefore, the virtualization software 4 includes, for example, a virtual machine generating unit 401 configured to generate virtual machines, a virtual machine starting unit 402 configured to start the virtual machines, a virtual machine shutdown unit 403 configured to shut down the virtual machines, a virtual machine suspend unit 404 configured to temporarily stop, that is, suspend the virtual machines in a started state, a virtual machine resume unit 405 configured to resume the virtual machines in a suspend state, a virtual machine operation information collecting unit 406 configured to collect operation information of the virtual machines, and an operation information notifying unit 407 configured to notify the management server 3 of the operation information.

Figure 3:
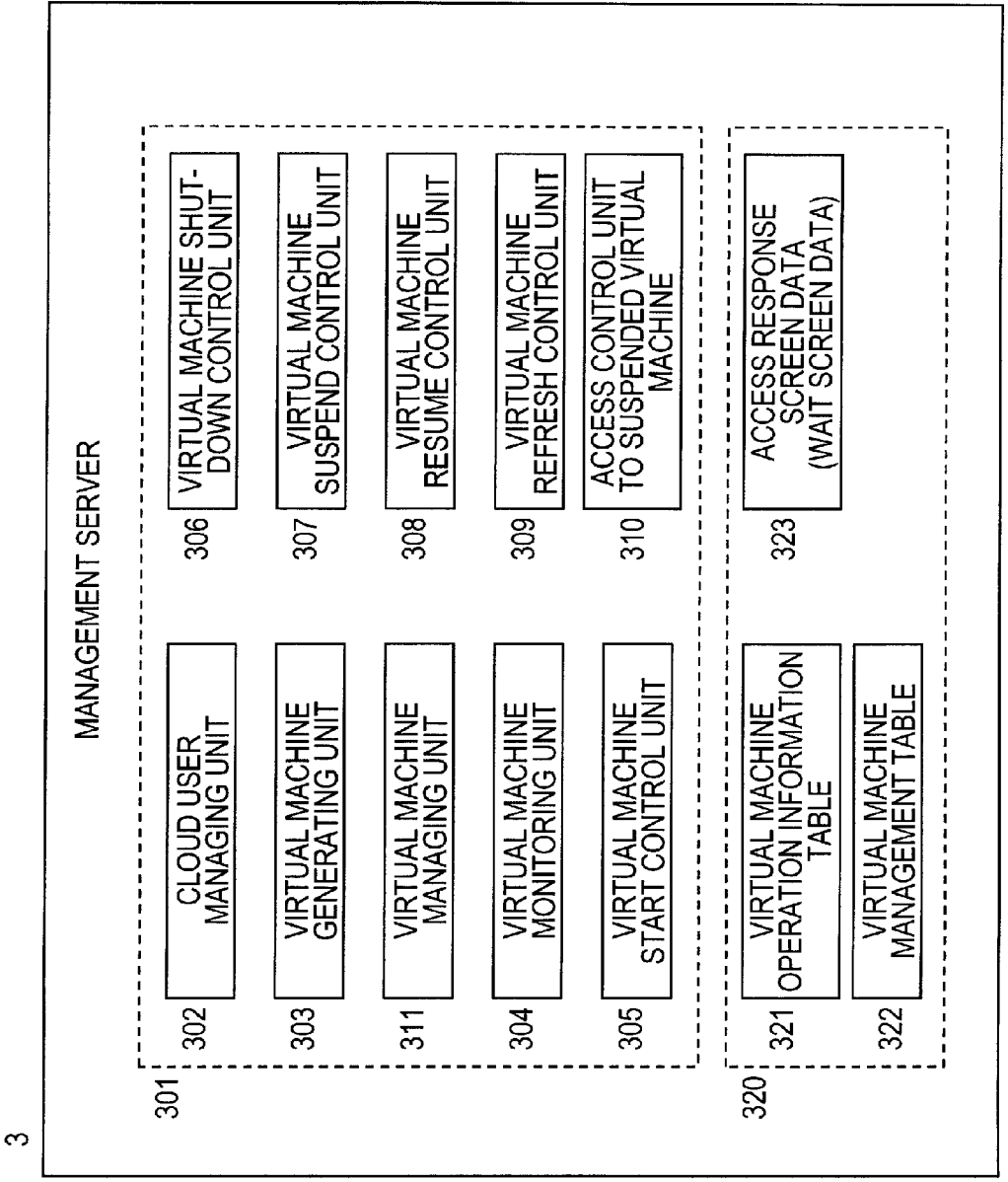
FIG. 3 is a diagram depicting a configuration example of the management server.

FIG. 3 is a diagram depicting a configuration example of the management server. The management server 3 includes software 301 and a storing unit 320 in addition to not-depicted hardware such as a CPU.

Functions of the software 301 when executed by the management server include a cloud user managing unit 302 configured to perform cloud user management such as charging processing for a cloud user who entered into a cloud contract in the cloud computing service portal site 2, a virtual machine generating unit 303 configured to allocate hardware resources and generate virtual machines VM on the basis of the cloud contract, a virtual machine managing unit 311 configured to manage the virtual machines, and a virtual machine monitoring unit 304 configured to monitor the operation of the virtual machines.

Further, the functions of the software 301 when executed by the management sever includes a virtual machine start control unit 305 configured to instruct the virtualization software 4 to start the virtual machines, a virtual machine shutdown control unit 306 configured to instruct the virtualization software 4 to shut down the virtual machines in a started state, a virtual machine suspend control unit 307 configured to instruct the virtualization software 4 to suspend the virtual machines in the started state, a virtual machine resume control unit 308 configured to instruct the virtualization software 4 to resume the virtual machines in a suspend state, a virtual machine refresh control unit 309 configured to instruct the virtualization software 4 to suspend the virtual machine in the suspend state after temporarily resuming the virtual machines, and an access control unit 310 configured to control accesses to the virtual machines in the suspend state.

The storing unit 320 in the management server stores information of a virtual machine operation information table 321 including, for example, operation information of the virtual machines reported from the virtualization software 4, information of a virtual machine management table 322 for managing the virtual machines, a cloud user, a contract of the cloud user, and the like, and wait screen data (access response screen data) 323 for displaying processing-in-progress for an access on a client terminal when resume processing takes time.

FIG. 19 is a diagram depicting an example of the virtual machine management table. In the virtual machine management table depicted in FIG. 19, IP addresses and wait screen data files for three virtual machines vm001, vm002, and vm003 are stored. The management server 3 performs management control for the virtual machines referring to the virtual machine management table.

FIG. 20 is a diagram depicting an example of the virtual machine operation information table. The table is explained in detail below.

Figure 21:
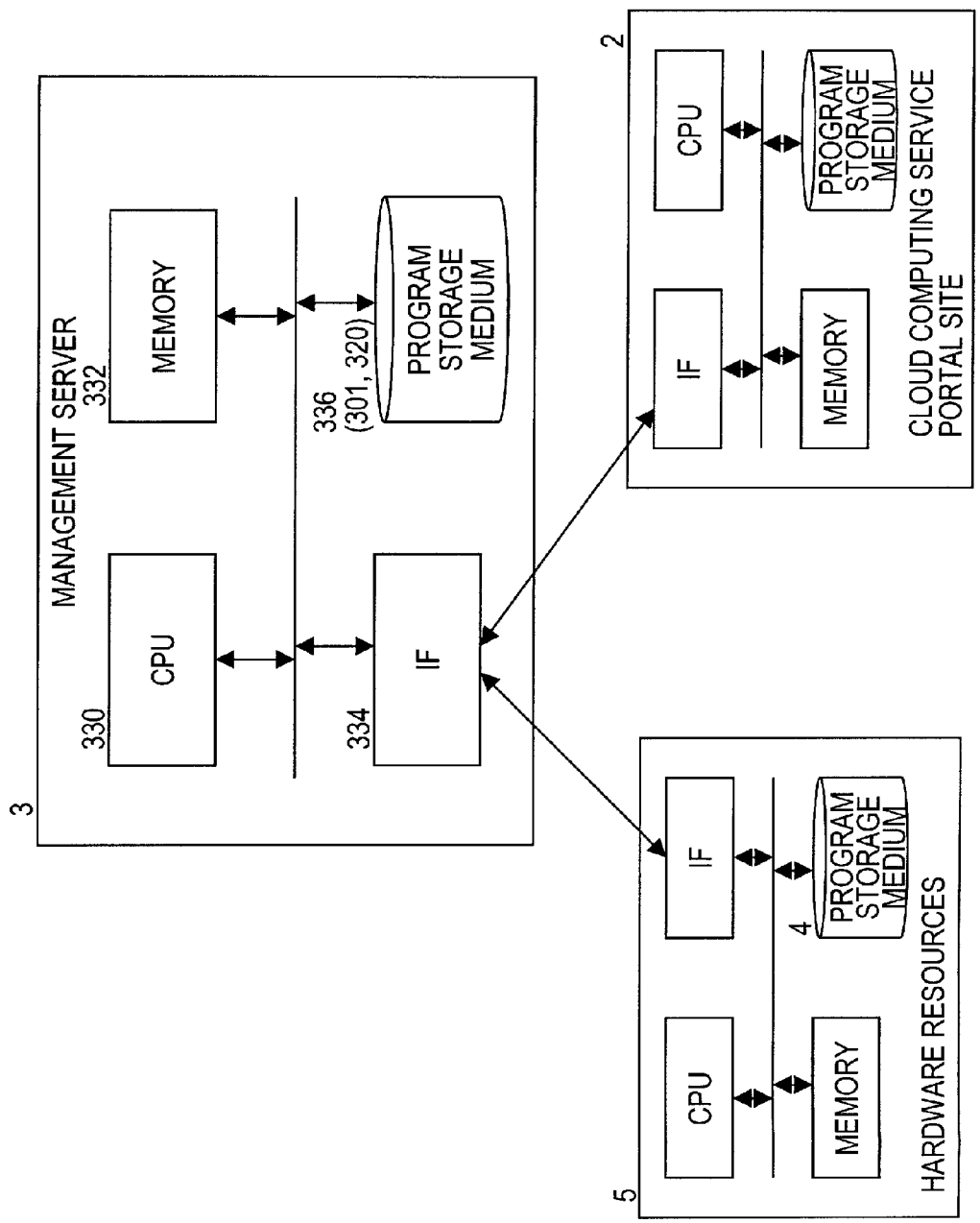
FIG. 21 is diagram depicting a hardware configuration of the cloud computing service portal site, the management server, and the hardware group in the server facility.

FIG. 21 is diagram depicting a hardware configuration of the cloud computing service portal site, the management server, and the hardware group in the server facility. The management server 3 includes a CPU 330, which is a processor, a memory 332, an external interface 334, and a storage medium 336 configured to store the software 301 and the information of the tables 321 to 323 of the management server depicted in FIG. 3. The CPU 330, the memory 332, the external interface 334, and the storage medium 336 are connected via a bus.

Like the management server 3, the cloud computing service portal site 2 includes a CPU, which is a processor, a memory, an external interface IF, and a storage medium configured to store site control software and the like. The CPU, the memory, the external interface IF, and the storage medium are connected via a bus. The hardware resource group 5 is a computer group including, like the management server 3, a CPU, which is a processor, a memory, an external interface IF, and a storage medium configured to store software and the like. The virtualization software 4 and the like depicted in FIG. 2 are stored in the storage medium in the hardware resource group 5. The software in the storage medium is stored in the memory so that CPU executes the software in the memory.

Monthly Charging and Meter Rate Charging

As charging of a cloud computing service, in general, there are monthly charging for charging a fixed rate irrespective of whether a cloud user caused virtual machines to operate using the hardware 5 and a meter rate charging for adding a rate corresponding to time during which the cloud user caused the virtual machines to operate using the hardware. In general, a time unit price is lower in the monthly charging than in the meter rate charging. That is, meter rate charging time unit price×24 h×30 days>monthly charging.

Usually, the cloud user selects the monthly charging or the meter rate charging according to job contents caused to operate on a cloud computing. For example, when the cloud user provides a Web service on the cloud computing, it is unpredictable when the Web service is accessed from a client terminal. Therefore, it is necessary to always keep virtual machines of the Web service in a started state. The cloud user needs to enter into a cloud computing contract with the monthly charging.

On the other hand, for example, when the cloud user provides a service for performing monthly processing on the cloud computing, the cloud user only has to sets the virtual machines in the started state only in the month end. In that case, the cloud user enters into a cloud computing contract with the meter rate charging and controls the start of the virtual machine at necessary time. That is, in the case of the meter rate charging, the cloud user temporarily sets the virtual machines in the started state in a necessary period of time and provides the service. In the other times, the cloud user controls the virtual machines to be shut down. According to the shutdown of the virtual machines, a cloud operator can release hardware allocated to the virtual machines and can improve efficiency of use of the hardware.

As explained above, for example, when the Web service, access time to which is unknown, is provided the monthly charging is selected. In this case, even when a frequency of use of the provided Web service is low, since the virtual machines are always in the started state, the monthly charging continues to be generated. Therefore, when the frequency of use is low, if the virtual machines can be started when an access occurs, it is possible to select the meter rate charging. However, it is not preferable to start or suspend the virtual machines in response to the occurrence of the access because, since it takes a fixed time until the virtual machine changes to an operation state, the start of processing responding to the access to the client terminal is delayed.

Problems of Resume of the Virtual Machines

Figure 4:
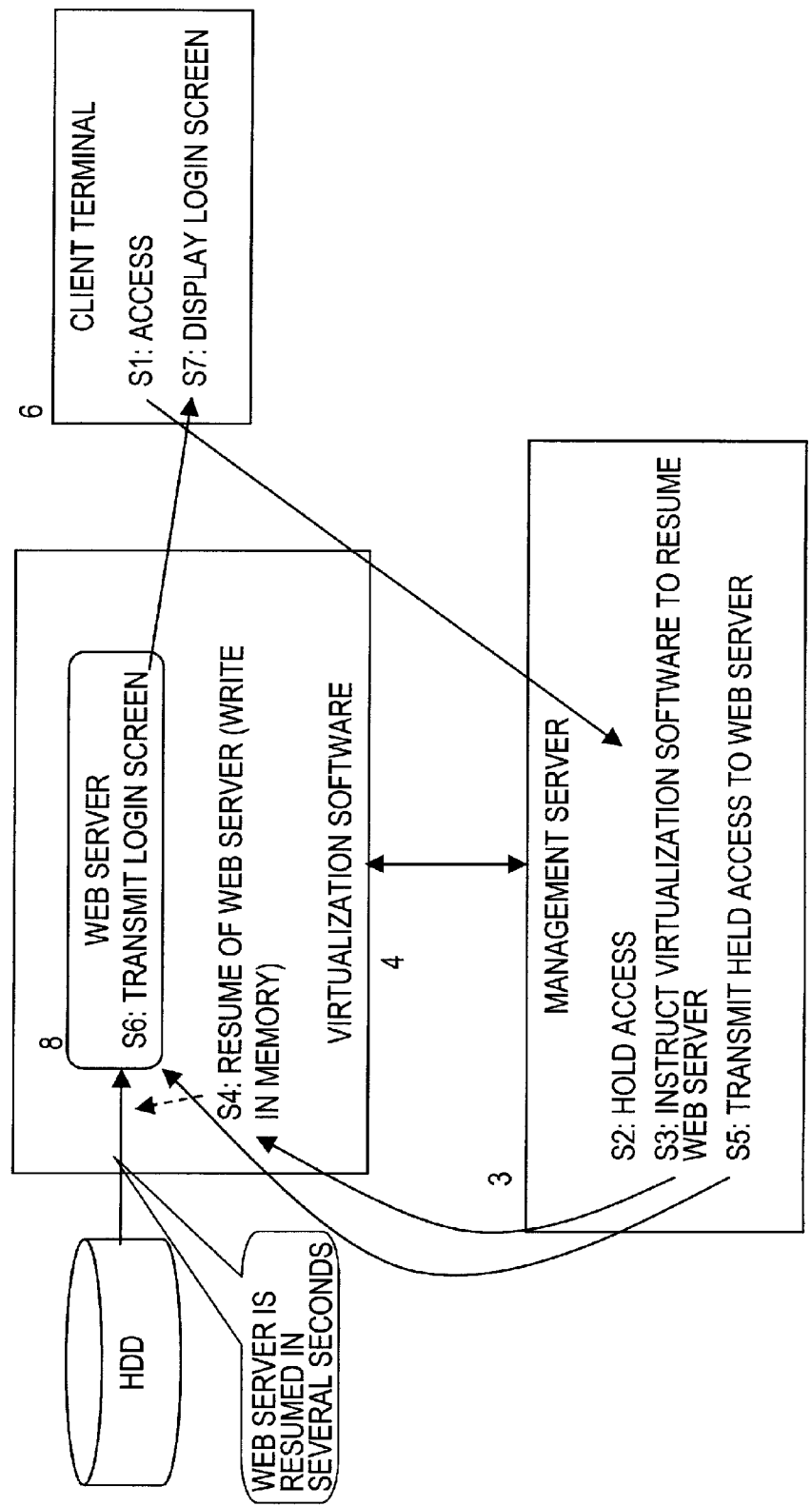
FIG. 4 is a diagram depicting the operation during resume of the Web server by the virtual machine.

FIG. 4 is a diagram depicting the operation during resume of the Web server by the virtual machine. In FIG. 4, the management server 3, the virtualization software 4, a Web server 8 configured by a virtual machine generated by the virtualization software 4, and processing contents of the client terminal 6 that accesses the Web server 8 are depicted. Processing S1 to S7 during the resume is explained below.

Before the explanation of the resume, suspension of the virtual machine is explained. The suspension of the virtual machine is temporary stop of the virtual machine. Processing of the suspension includes a stop of allocation of hardware such as a CPU to the virtual machine, saving of data and information in a memory of the virtual machine in a hard disk, saving of context, including an address of instruction being executed by the CPU of the virtual machine, and data in various registers (a general-purpose register, a floating point register, etc.) in the hard disk, and release of hardware resources allocated to the virtual machine.

On the other hand, the resume of the virtual machine means resuming the virtual machine in a temporarily stopped state. Processing of the resume includes allocation of hardware resources to the virtual machine, readout of the context from the hard disk and restoration of the context in the CPU, readout of data and information stored in the memory of the virtual machine from the hard disk and restoration of the data and the information in the memory, and resume of allocation of hardware such as the CPU to the virtual machine.

As depicted in FIG. 4, first, the client terminal 6 executes an access to the Web server 8 (S1). When the Web server 8 is in a suspend state, an IP address of an access destination to the Web server 8 is written to the management server 3. Therefore, the client terminal 6 accesses the management server 3. In response to the access, the management server 3 once hold the access (S2) and instructs the virtualization software 4 to resume the virtual machine VM configuring the Web server 8 (S3).

The virtualization software 4 executes resume processing for the virtual machine VM in response to the resume instruction (S4). In the resume processing, the virtualization software 4 reads out the context and the data in the memory saved during the suspension from the hard disk HDD and writes the context and the data in the CPU and the memory of the Web server 8. When the resume processing is completed, the management server 3 transmits the held access to the Web server 8 (S5). In response to the transmission of the access, the Web server 8 processes the access and transmits a login screen to the client terminal 6 (S6). According to the transmission of the login screen, the client terminal 6 displays the login screen (S7).

As explained above, for example, when the Web server 8 only has to be resumed in response to the access from the client terminal, mainly after processing for transferring data from the hard disk HDD to the memory, the Web server 8 can respond to the client terminal. Therefore, long time is not taken for the resume.

Figure 5:
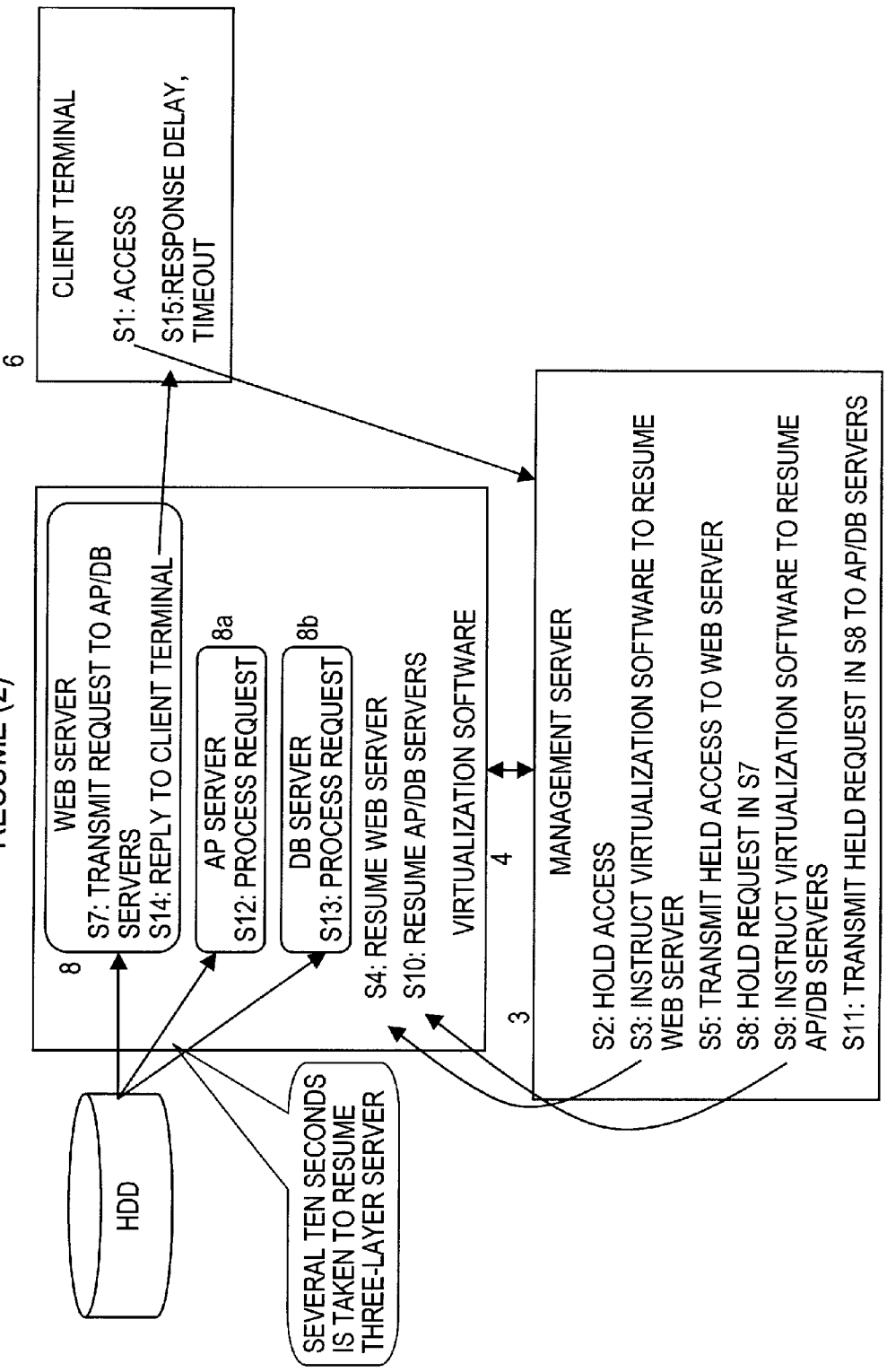
FIG. 5 is a diagram depicting another example of the operation during the resume of the Web server by the virtual machine.

FIG. 5 is a diagram depicting another example of the operation during the resume of the Web server by the virtual machine. In FIG. 5, processes of the management server 3, the virtualization software 4, the Web server 8 configured by the virtual machine VM, and the client terminal 6 that accesses the Web server 8 are also depicted. Processing S1 to S7 during the resume is explained below.

In an example depicted in FIG. 5, the Web server 8 provides a predetermined service in cooperation with an application server (AP server) 8a and a database server (DB server) 8b. First, the client terminal 6 executes an access to the Web server 8 (S1). The management server 3 holds the access (S2) and instructs the virtualization software 4 to resume the Web server 8 (S3). The virtualization software 4 resumes the Web server 8 (S4). The management server 3 transmits the held access to the Web server 8 (S5). Processing from S1 to S5 is the same as the processing depicted in FIG. 4.

In the example depicted in FIG. 5, thereafter, the Web server 8 transmits necessary requests to the AP server 8a and the DB server 8b In response to the received access (S7). Since the AP server 8a and the DB server 8b are also in the suspend state, the requests are transmitted to the management server 3. The management server 3 once holds the requests (S8), and instructs the virtualization software 4 to resume the AP server 8a and the DB server 8b (S9). In response to the instruction, the virtualization software 4 executes resume of the AP server 8a and the DB server 8b (S10).

Then, the management server 3 transmits the held requests to the resumed AP server 8a and DB server 8b (S11). The AP server 8a and the DB server 8b process the requests and reply to the Web server 8 (S12 and S13). In response to the reply, the Web server 8 sends a reply to the access to the client terminal 6 (S14).

However, in the example depicted in FIG. 5, in response to the access from the client terminal 6, after the resume of the Web server 8 and the resume of the AP server 8a and the DB server 8b, the Web server 8 returns an access response to the client terminal 6. Several ten seconds is sometimes taken for such resume in three layers. Therefore, the client terminal 6 observes a response delay and observes timeout for the access.

Figure 6:
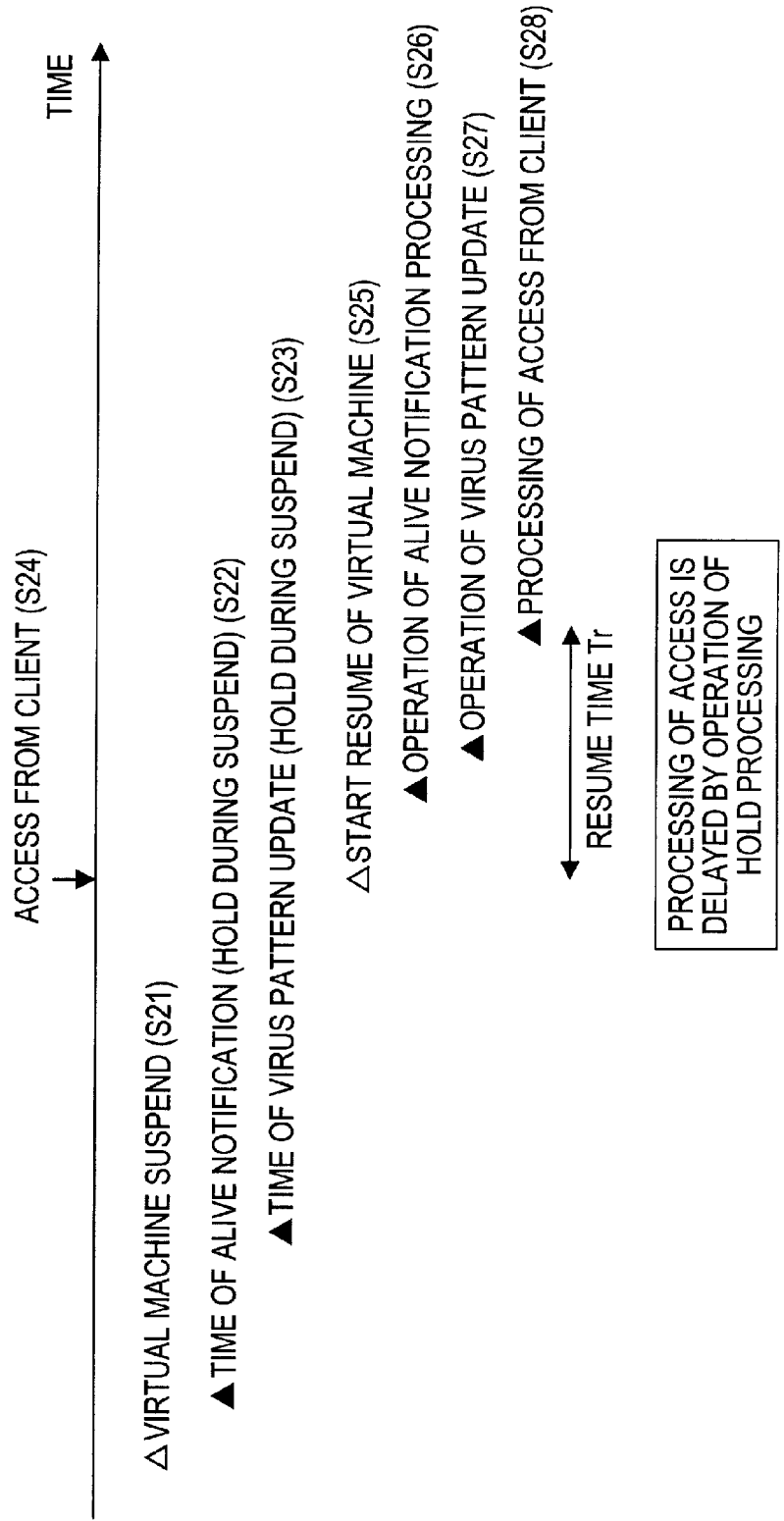
FIG. 6 is a diagram depicting a delay of resume of the virtual machine.

FIG. 6 is a diagram depicting a delay of resume of the virtual machine. An OS of the virtual machine periodically executes a refresh operation. The periodic refresh operation includes periodic processing for updating a virus pattern and periodic alive notification processing. In the periodic processing for updating a virus pattern, the virtual machine voluntarily accesses a virus pattern update server through a network and downloads the latest virus pattern. In the periodic alive notification processing, the virtual machine voluntarily accesses an alive check server or the like through the network and transmits a message for notifying that the virtual machine is operating. The periodic refresh operation includes, besides the above, for example, version upgrade for the OS and the application and periodic write processing for a log file in the hard disk.

However, in the virtual machine in the suspend state, since the operation of the OS is stopped, the periodic refresh operation is put in a hold state. As a result, when the virtual machine in the suspend state is resumed, refresh operations put in the hold state are started all at once. Therefore, substantial resume processing including a refresh operation in addition to the resume processing takes a long time. As a result, in some case, the start of the access processing triggering the resume is delayed and a response to the access is substantially delayed.

In the resume in FIG. 6, processing S21 to S28 is executed according to a time axis of the abscissa. First, the virtual machine VM is suspended (S21). A refresh operation in the virtual machine VM in the suspend state is held (S22 and S23). As explained above, the refresh operation is the processing of alive notification, the processing of virus pattern update, and the like. Usually, the OS of the virtual machine VM performs timer management concerning the refresh operation and voluntarily starts the refresh operation periodically. However, since the virtual machine VM is suspended and the OS is in an operation stopped state, the processing is not executed even if time for alive notification and time for virus pattern update comes in the timer management.

In the mean time, an access from the client terminal occurs (S24). With the access as a trigger, the resume of the virtual machine VM is started as explained with reference to FIG. 5 (S25). When the virtual machine VM is resumed and the OS starts execution, the periodic refresh operation is started according to the timer management. So an operation of the alive notification processing (S26) and the operation of the virus pattern update (S27) are executed by the OS. After the refresh operation is completed, the resumed virtual machine VM starts processing of the access (S28). Therefore, a resume time Tr until completion of the resume is relatively long. The start of the processing of the access is substantially delayed.

Usually, the OS executes the refresh operation according to the own timer management. Therefore, the refresh operation is an operation that the OS performs by voluntarily accessing the outside via the network rather than an operation performed in response to an access from the outside. The version upgrade operation for the software is the same.

Virtual Machine Management Program in this Embodiment

The virtual machine management program in this embodiment is executed by the management server 3 and provides the cloud user with automatic meter rate charging (or high-speed resume meter rate charging) different from the conventional monthly charging and meter rate charging.

Figure 7:
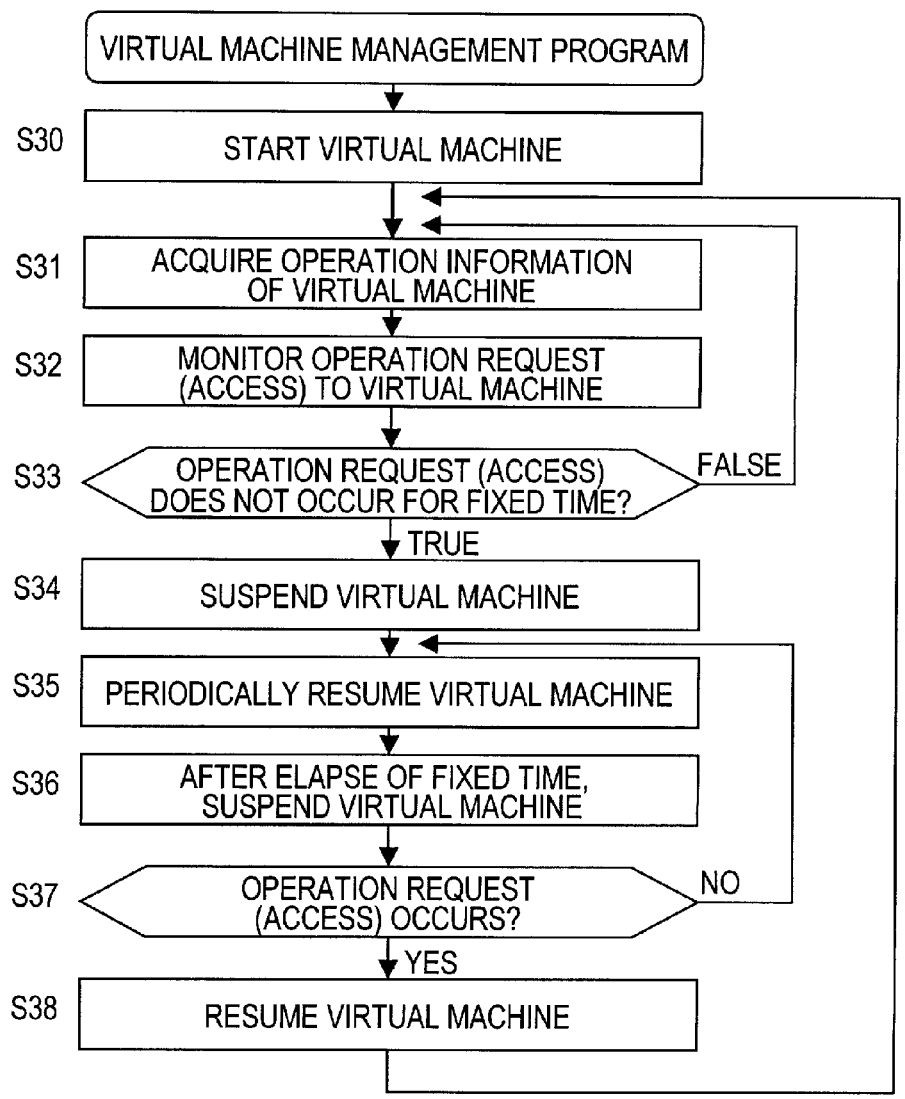
FIG. 7 is a flowchart of a virtual machine management program in this embodiment.

FIG. 7 is a flowchart of a virtual machine management program in this embodiment. As explained above, the management server 3 performs the management control for the virtual machine VM in association with the virtualization software 4. On the basis of conclusion of a contract in the cloud computing service portal site 2 by the cloud user terminal 1, the management server 3 instructs the virtualization software 4 to allocate hardware to the virtual machine VM and executes start control for instructing the virtualization software 4 to start the virtual machine VM (S30). Consequently, the virtual machine VM changes to the started state. The virtual machine VM executes an application of the cloud user, whereby a service of the cloud user is provided.

During the operation of the virtual machine VM in the started state, the management server 3 acquires operation information of the virtual machine VM (S31) and monitors an access to the virtual machine VM (S32). The access to the virtual machine VM is a kind of an operation request to the virtual machine VM. Besides the access, the management server 3 may monitor an event for requesting the virtual machine VM to perform some operation. The virtualization software 4 collects operation information of the virtual machine VM and transmits the operation information to the management server 3. The management server 3 receives the transmission of the operation information by the virtualization software and acquires the operation information. The operation information of the virtual machine VM and the monitoring of the access to the virtual machine VM are explained in detail below.

While the access to the virtual machine VM occurs (FALSE in S33), the management server 3 continuously performs the acquisition S31 of the operation information of the virtual machine VM and the monitoring S32 of the access to the virtual machine VM. However, when the access to the virtual machine VM does not continuously occur for a fixed time (TRUE in S33), the management server 3 executes suspend control for causing the virtualization software 4 to suspend the virtual machine VM (S34). Processing of the suspension of the virtual machine VM is as explained above.

When the virtual machine VM is suspended, the hardware allocated to the virtual machine VM by the virtualization software 4 is released. Consequently, the released hardware may be allocated to virtual machine VMs for other services. The cloud computing operator is able to improve efficiency of use of the hardware.

While the virtual machine VM is in the suspend state, the management server 3 monitors whether an event for requesting the operation of the virtual machine VM, for example, an access to the virtual machine VM occurs (S37). When the access occurs (YES in S37), in a state in which the access is held, the management server 3 executes resume control for instructing the virtualization software 4 to resume the virtual machine VM (S38). The resume processing for the virtual machine VM is as explained above. After the resume of the virtual machine VM is completed, the management server 3 transmits the held access to the virtual machine VM in the resume state. Processing performed by the management server 3 and the virtualization software 4 when the access occurs is equivalent to, for example, the processing explained with reference to FIGS. 4 and 5.

According to this embodiment, while the virtual machine VM is in the suspend state, that is, while the access to the virtual machine VM does not occur (NO in S37), the management server 3 periodically executes resume control S35 on the virtualization software 4 and, after a refresh operation time length, executes suspend control S36. According to the periodic resume, the virtual machine VM changes to a temporary operation state and executes the refresh operation according to the timer management by the OS.

When the access to the virtual machine VM occurs (YES in S37), the management server 3 executes resume control for instructing the virtualization software to resume the virtual machine VM. In the resume, the virtual machine VM does not perform the refresh operation. This is because it is highly probable that the refresh operation, which should be periodically executed, is already completed by the temporary resume S35 and the suspension of the virtual machine VM S36 periodically performed during the suspension. Therefore, the refresh operation by the OS during the resume operation after the access does not occur or, even if the refresh operation occurs, the refresh operation occurs only slightly. When the resume of the virtual machine VM is completed, the management server 3 transmits the received access to the virtual machine VM and causes the virtual machine VM to execute processing of a request corresponding to the access.

The management server 3 may detect, from the operation information of the virtual machine VM acquired in step S31, a timing and a time length of the refresh operation periodically executed by the virtual machine VM. While the access to the virtual machine VM does not occur, the management server 3 may execute the resume control S35 on the virtualization software 4 at a timing based on the timing of the refresh operation and, after the refresh operation time length, may perform the suspend control S36. In response to the resume control S35, the virtualization software 4 causes the virtual machine VM in the suspend state to execute the resume processing. In this case, the periodic resume control S35 for the suspended virtual machine VM is performed at the timing of the refresh operation of the virtual machine VM that is normally operating. Therefore, in the temporary resume state, the virtual machine VM executes the periodic refresh operation.

The temporary resume control S35 and the suspend control S36 for the virtual machine VM in the suspend state do not always have to be matched to the timing of the periodic refresh operation detected on the basis of collected operation information. After the timing of the periodic refresh operation, the management server 3 may execute the temporary resume control S35 and the suspend control S36. In either case, the temporary resume control S35 is performed when the access does not occur. Therefore, even if a certain time period is taken when the virtual machine VM executes the refresh operation according to the temporary resume, no problem occurs.

Note that, according to this embodiment, when the virtual machine VM is subjected to resume control in response to the occurrence of the access S37, if time is taken for the resume, the management server 3 may transmit data of an access response screen (a wait screen) for displaying processing-in-progress for the access provided by the cloud user in advance to an accessing client terminal and cause the client terminal to display the access response screen. Consequently, it is possible to prevent or suppress the Web server from being observed by the client that the Web server is performing the resume operation.

According to this embodiment, when the management server 3 periodically performs the resume control (S35), if an access occurs to the virtual machine VM that is performing the refresh operation in the resume state, the management server 3 causes the virtual machine VM to execute response processing to the access without suspending. That is, the management server 3 normally performs access control for receiving and holding an access to the suspended virtual machine VM, if the virtual machine VM is suspended. However, if the virtual machine VM is accidentally in the periodical resumed state when the access occurs, it is preferable that the management server 3 transmits the access to the virtual machine VM and causes the virtual machine VM to perform processing.

Further, according to this embodiment, when an event for requesting an operation such as an access does not occur in the virtual machine VM continuously for a fixed time, the management server 3 suspends and temporarily stops the OS of the virtual machine VM rather than shutting down the OS. It is not preferable to shut down the OS of the virtual machine VM because it is necessary to start the OS again when the virtual machine VM is resumed, boot processing is involved, and a long time is taken. In this embodiment, since the suspension processing is performed, the resume processing only has to be performed when an access occurs next. Therefore, it is possible to reduce time taken for the resume and return a response to the access within an appropriate wait time.

Operation of an Automatic Meter Rate Charging Contract

Figure 8:
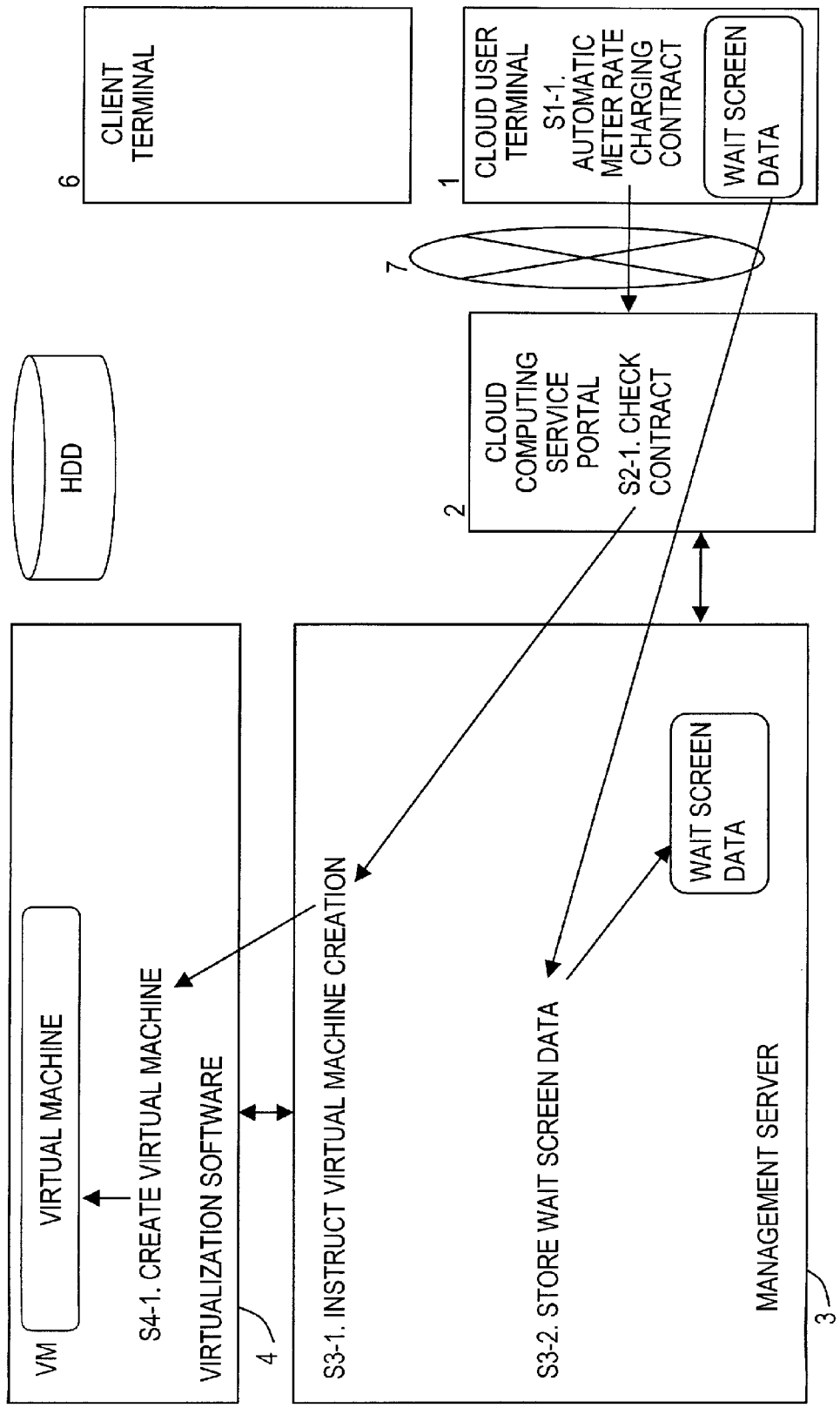
FIG. 8 is a diagram depicting an operation performed in entering into an automatic meter rate charging contract in this embodiment.
Figure 9:
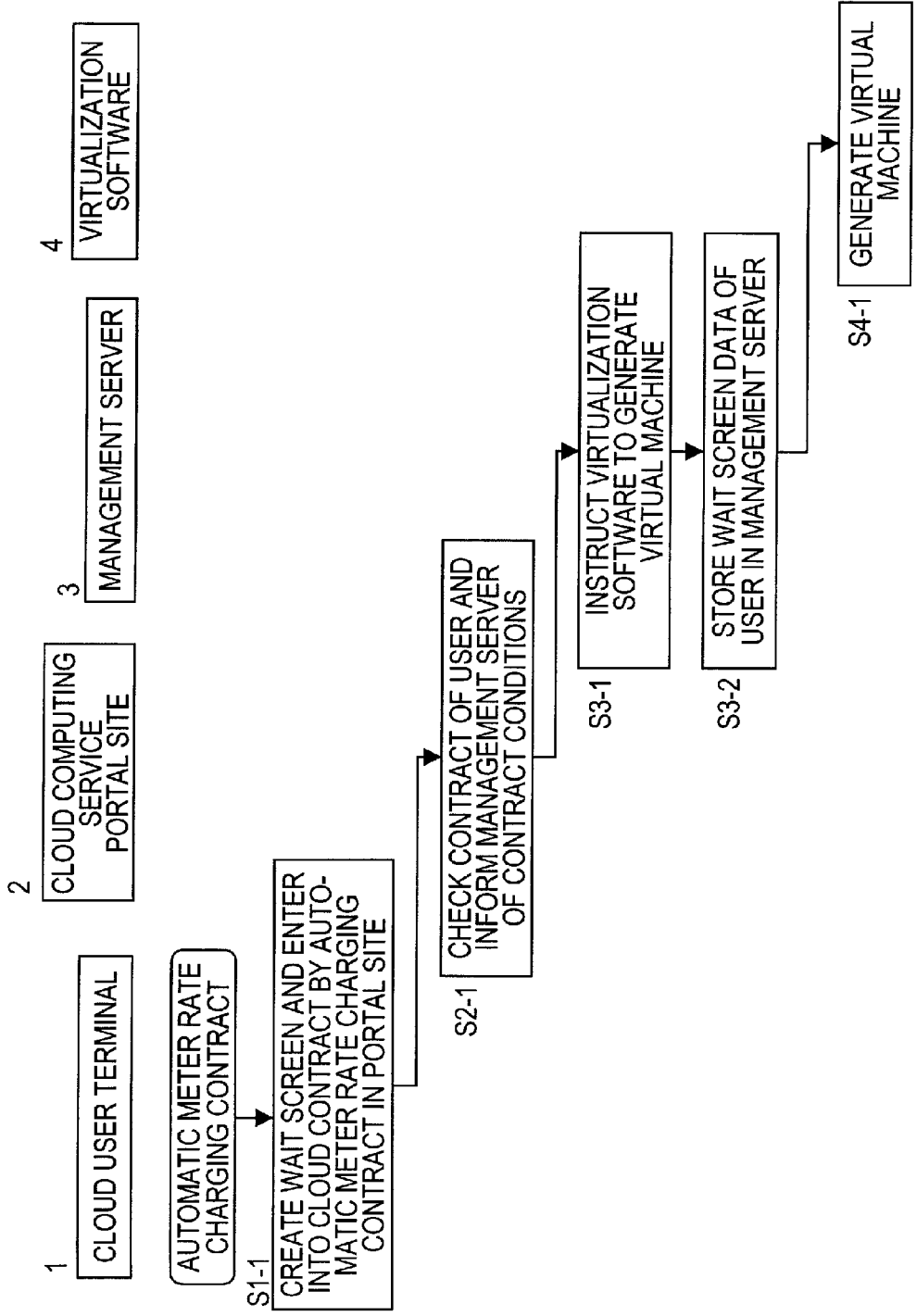
FIG. 9 is a flowchart in entering into the automatic meter rate charging contract in this embodiment.

FIG. 8 is a diagram depicting an operation performed in entering into an automatic meter rate charging contract in this embodiment. In FIG. 8, processing in the cloud user terminal 1, the cloud computing service portal site 2, the management server 3, and the virtualization software 4 is depicted. FIG. 9 is a flowchart in entering into the automatic meter rate charging contract in this embodiment. In FIG. 9, the operation depicted in FIG. 8 is depicted as the flowchart. The operation of the automatic meter rate charging contract is explained below with reference to FIGS. 8 and 9.

First, the cloud user terminal 1 accesses the cloud computing service portal site 2 and enters into an automatic meter rate charging contract (S1-1). In entering into the contract, the cloud user selects the automatic meter rate charging as a charging form out of the monthly charging, the meter rate charging, and the automatic meter rate charging in addition to contract conditions such as the number of clocks of the CPU of the virtual machine VM, a capacity of the memory, a capacity and IOPS of the hard disk, bandwidth of the network, and an OS. The cloud user creates, in advance, data of an access response screen (a wait screen) for displaying access-response-in-progress and stores the data in the cloud user terminal 1. As explained below, the access response screen is screen data for displaying, when an access from the client terminal 6 to the virtual machine VM in the suspend state occurs, if the resume processing for the virtual machine VM takes time, access-response-in-progress on the client terminal in order to prevent the client from noticing that the resume processing takes time.

The cloud computing service portal site 2 checks the contract (S2-1) and informs the management server 3 of the contract conditions. In response to the information, the management server 3 instructs the virtualization software 4 to generate a virtual machine VM that satisfies the contract conditions (S3-1). The cloud user terminal 1 transmits the data of the access response screen (the wait screen) for displaying access-response-in-progress to the management server 3. The management server 3 stores the screen data (S3-2). In response to the generation instruction by the virtual machine VM, the virtualization software 4 allocates the hardware, generates the virtual machine VM, and starts the virtual machine VM (S4-1).

Access Monitoring and Suspend Control by the Management Server

In the contract of the automatic meter rate charging in this embodiment, when an operation request, for example, an access to the virtual machine VM does not continuously occurs for a fixed time, the management server 3 automatically executes control for suspending the virtual machine VM. When an access to the virtual machine VM in the suspend state occurs, the management server 3 executes control for resuming the suspended virtual machine VM.

While the virtual machine VM is suspended, hardware allocated to the virtual machine VM is released and may be allocated to other virtual machines VM. While the virtual machine VM is suspended, since the cloud user is not charged, it is possible to suppress cloud use costs for the cloud user.

The management server 3 periodically subjects the suspended virtual machine VM to resume control, causes the virtual machine VM to execute a refresh operation, and thereafter subjects the virtual machine VM to the suspend control. Since the virtual machine VM in the suspend state is periodically caused to perform the refresh operation, in the resume processing performed when an access occurs thereafter, the virtual machine VM does not need to perform the refresh operation held during the suspension. Therefore, it is possible to prevent the resume processing from being continued for a long time and respond to the access in a short time.

Figure 10:
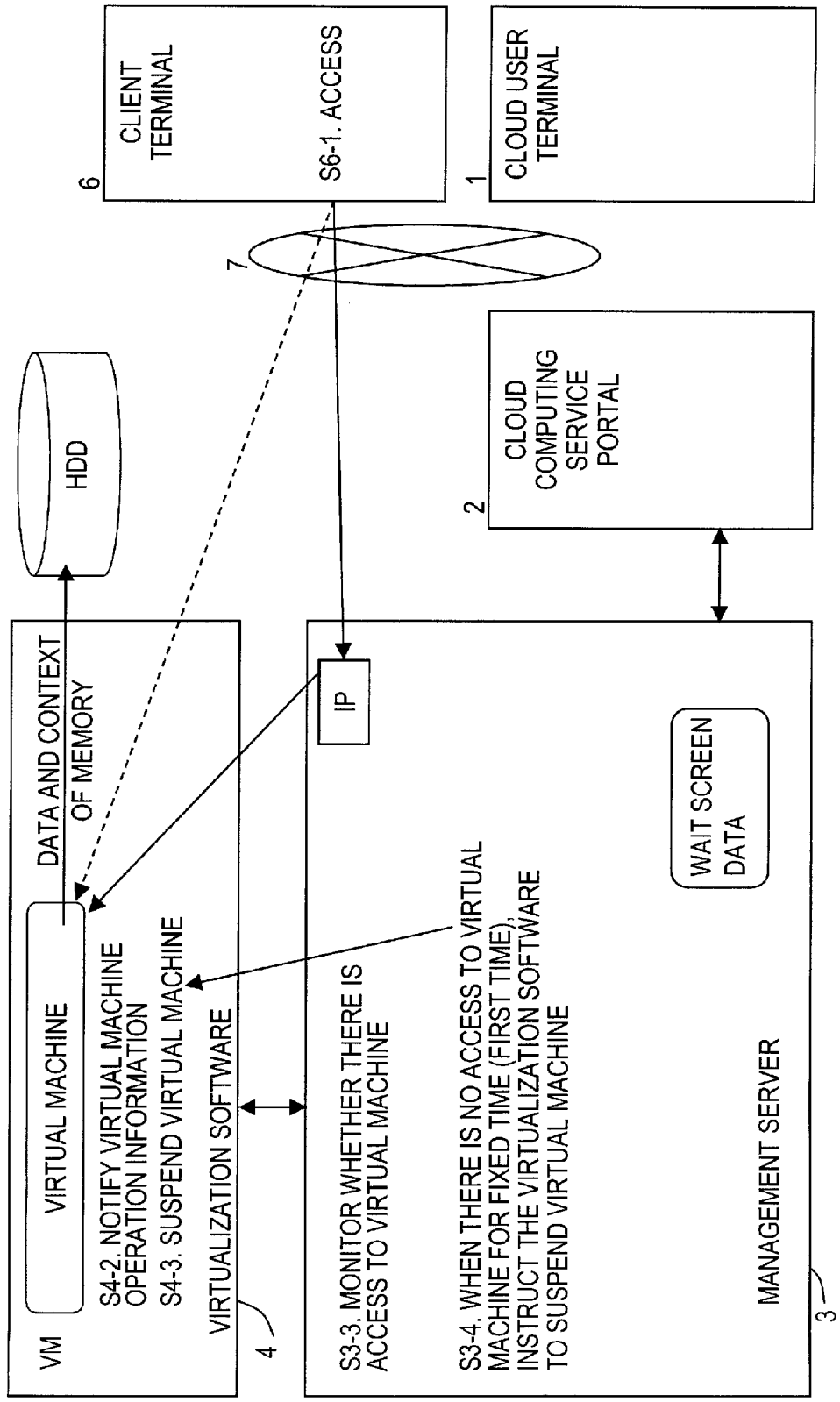
FIG. 10 is a diagram depicting the access monitoring and the suspend control by the management server.

FIG. 10 is a diagram depicting the access monitoring and the suspend control by the management server. The monitoring of an access to the operating virtual machine and the suspend control performed when an access does not continuously occur for a fixed time are explained with reference to FIG. 10.

As depicted in FIG. 10, the client terminal 6 accesses the virtual machine VM in the started state (S6-1). When an IP address of the virtual machine VM is present in the virtual machine VM, the access is directly transmitted to the virtual machine VM as indicated by a broken line in the figure. When the IP address of the virtual machine VM is set in the management server 3, the access is transmitted from the client terminal 6 to the virtual machine VM via the management server 3 as indicated by a solid line in the figure. The management server 3 monitors an access to the virtual machine VM (S3-3). The virtualization software 4 monitors an operation state of the virtual machine VM and notifies operation information of the virtual machine VM to the management server 3 (S4-2).

When the access is directly transmitted to the virtual machine VM, the management server 3 can detect the occurrence of the access from virtual machine information collected by the virtualization software 4. When the access is transmitted through the management server 3, the management server 3 can detect the occurrence of the access.

When an access from the outside such as the client terminal 6 to the virtual machine VM does not continuously occur for a fixed time, the management server 3 executes suspend control for instructing the virtualization software 4 to suspend the virtual machine VM charged by the automatic meter rate charging (S3-4). In response to the suspension instruction, the virtualization software 4 suspends the virtual machine VM (S4-3). Processing necessary for the suspension is as explained above. Consequently, the virtualization software 4 stops allocation of the hardware to the virtual machine VM. The virtual machine VM stops the operation, writes context and data in the memory of the virtual machine VM in the hard disk HDD, and releases hardware resources allocated to the virtual machine VM.

Resume Control During Access Occurrence by the Management Server

Figure 11:
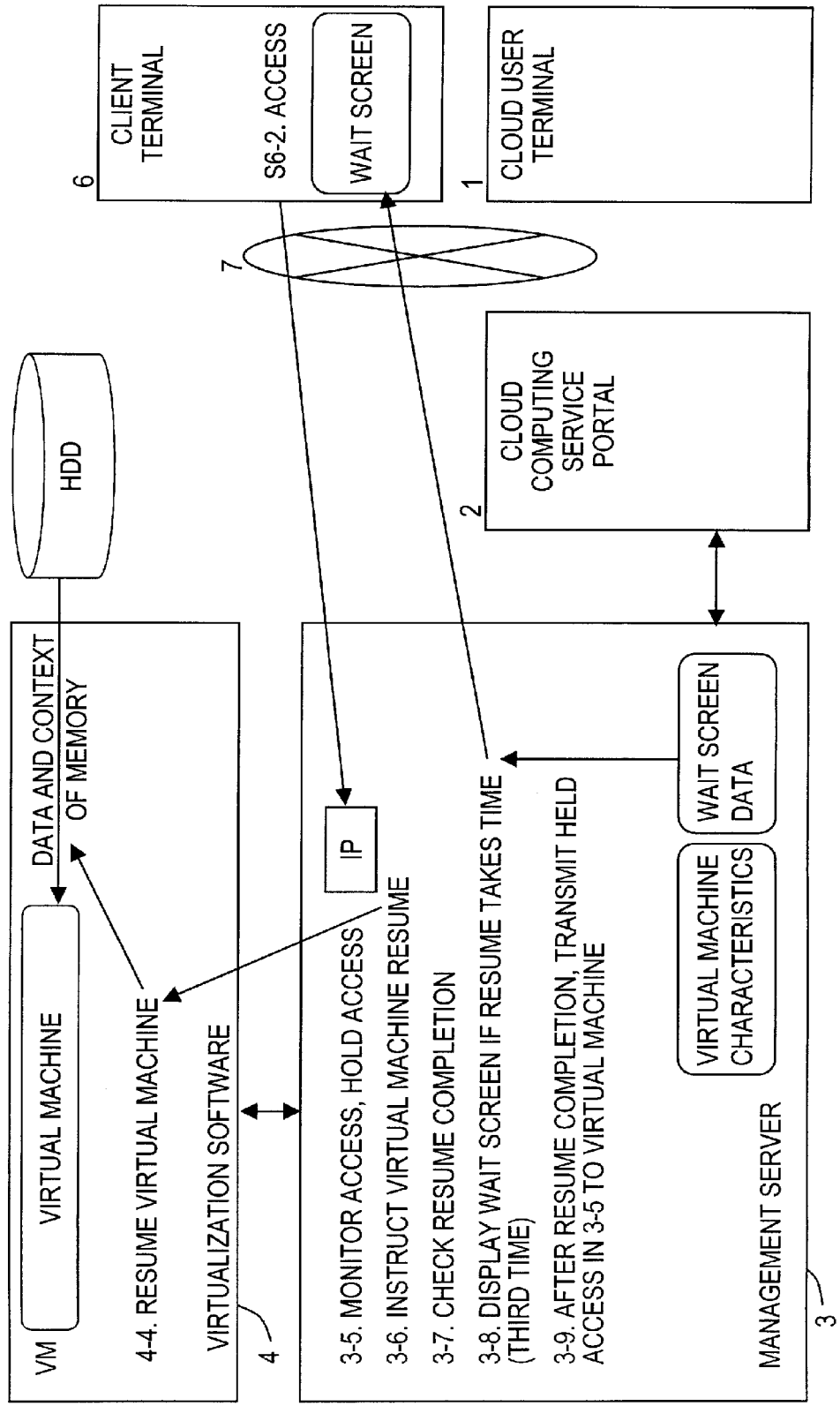
FIG. 11 is a diagram depicting resume control during access occurrence by the management server.
Figure 12:
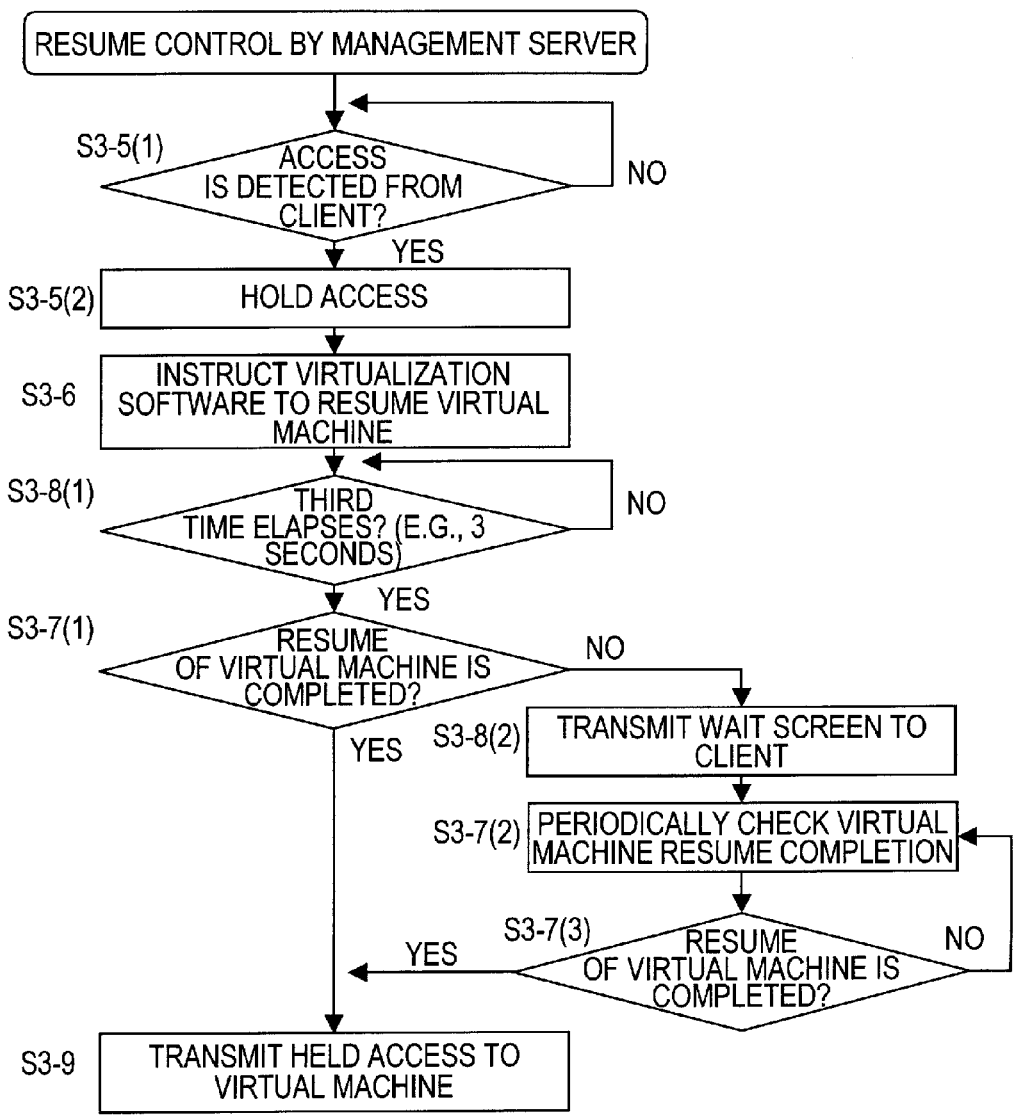
FIG. 12 is a flowchart of the resume control during access occurrence by the management server.

FIG. 11 is a diagram depicting resume control during access occurrence by the management server. FIG. 12 is a flowchart of the resume control during access occurrence by the management server.

In FIG. 11, an access from the client terminal 6 to the virtual machine VM occurs (S6-2). While the virtual machine VM is suspended, an IP address to the virtual machine VM is set in the management server 3. Therefore, the management server 3 receives the access. The management server 3 monitors an access to the suspended virtual machine VM and, when an access occurs, once holds the access (S3-5). The management server 3 executes resume control for instructing the virtualization software 4 to resume the virtual machine VM (S3-6).

In response to the resume instruction, the virtualization software 4 resumes the virtual machine VM (S4-4). Resume processing is as explained above. That is, the virtualization software 4 allocates the hardware resources to the virtual machine VM, reads out a context and data from the hard disk HDD, writes the context and the data in the CPU and the memory of the virtual machine VM, and resumes allocation of the hardware resources to the virtual machine VM. Consequently, the virtual machine VM changes to an operating state (a started state).

The management server 3 receives a resume completion notification of the virtual machine VM from the virtualization software 4 and checks the resume completion (S3-7). When the resume takes time, for example, when the resume processing exceeds a third time, the management server 3 returns the stored access response screen (wait screen) data to the accessing client terminal 6 and causes the client terminal 6 to display the access response screen (the wait screen) (S3-8). Consequently, the management server 3 prevents the client from noticing that the virtual machine VM is being resumed.

After the resume completion, the management server 3 transmits the access held in step S3-5 to the resumed virtual machine VM (S3-9). In response to the transmission of the access, the virtual machine VM returns an access response to the client terminal 6.

As specifically depicted in FIG. 12, the resume control by the management server 3 is as explained below. Note that numbers of steps in FIG. 12 are consistent with the numbers of the steps in FIG. 11.

First, the management server 3 monitors an access to the suspended virtual machine VM from the client (S3-5(1)). When an access is detected, the management server 3 once holds the access (S3-5(2)). The management server 3 instructs the virtualization software 4 to resume the virtual machine VM (S3-6).

The management server 3 stays on standby for a third time, for example, until three seconds elapses (S3-8(1)). If the resume of the virtual machine VM is completed (YES in S3-7(1)), the management server 3 transmits the held access to the virtual machine VM (S3-9). If the resume of the virtual machine VM is not completed even after the management server 3 stays on standby for the third time (NO in S3-7(1)), the management server 3 returns the access response screen (the wait screen) data to the client terminal 6 and causes the client terminal 6 to display the access response screen (S3-8 (2)). Thereafter, the management server 3 periodically checks the resume completion of the virtual machine VM (S3-7(2)). If the resume is completed (YES in S3-7(3)), the management server 3 transmits the held access to the virtual machine VM (S3-9).

Periodic Refresh Operation and Operation Information Acquisition from the Virtual Machine VM by the Management Server With the automatic meter rate charging in this embodiment, in order to periodically cause the suspended virtual machine VM to perform a refresh operation, the management server 3 periodically executes the resume of the virtual machine VM and the suspend control. The timing of the refresh operation only has to be, for example, periodically set. Since the virtual machine VM is periodically caused to perform the refresh operation, in the resume processing performed when an access from the client terminal 6 occurs at any timing, it is possible to reduce the probability that the refresh operation held during the suspension is performed and perform an access response in a short time.

Preferably, the management server 3 acquires operation information of the virtual machine VM, extracts a timing and an operation time length of the refresh operation of the virtual machine VM from the operation Information, subjects the suspended virtual machine VM to the resume control according to the timing, and performs the suspend control after the operation time length elapses. If the management server 3 extracts a timing and an operation time length of the refresh operation extracted from operation Information during a normal operation of the virtual machine VM and causes the virtual machine VM to securely execute the refresh operation at the timing, then, in the resume processing performed when an access from the client terminal 6 occurs, the refresh operation is not executed. Therefore, it is possible to accelerate an access response.

Figure 13:
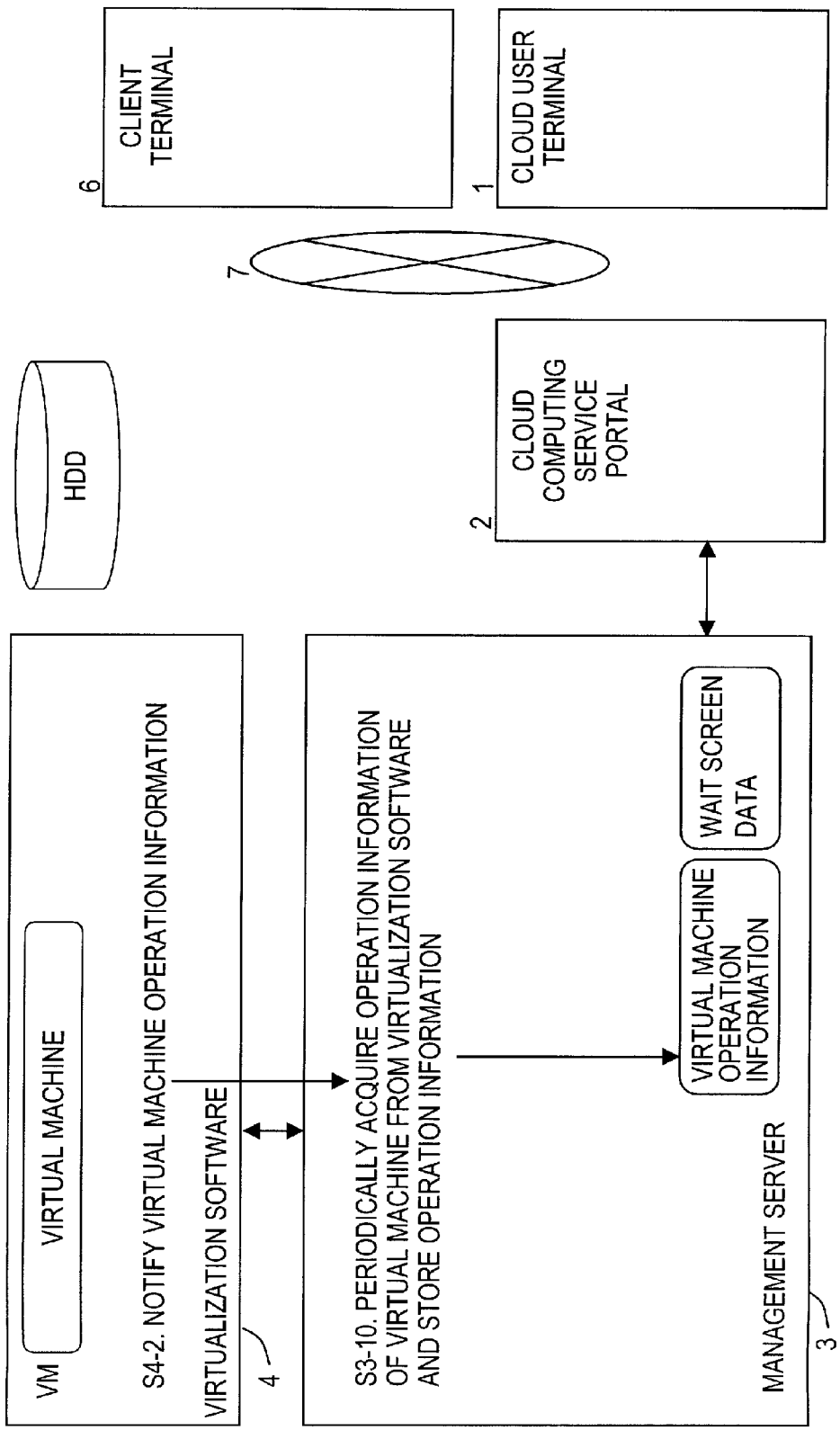
FIG. 13 is a diagram depicting operation information acquisition from the virtual machine by the management server.
Figure 14:
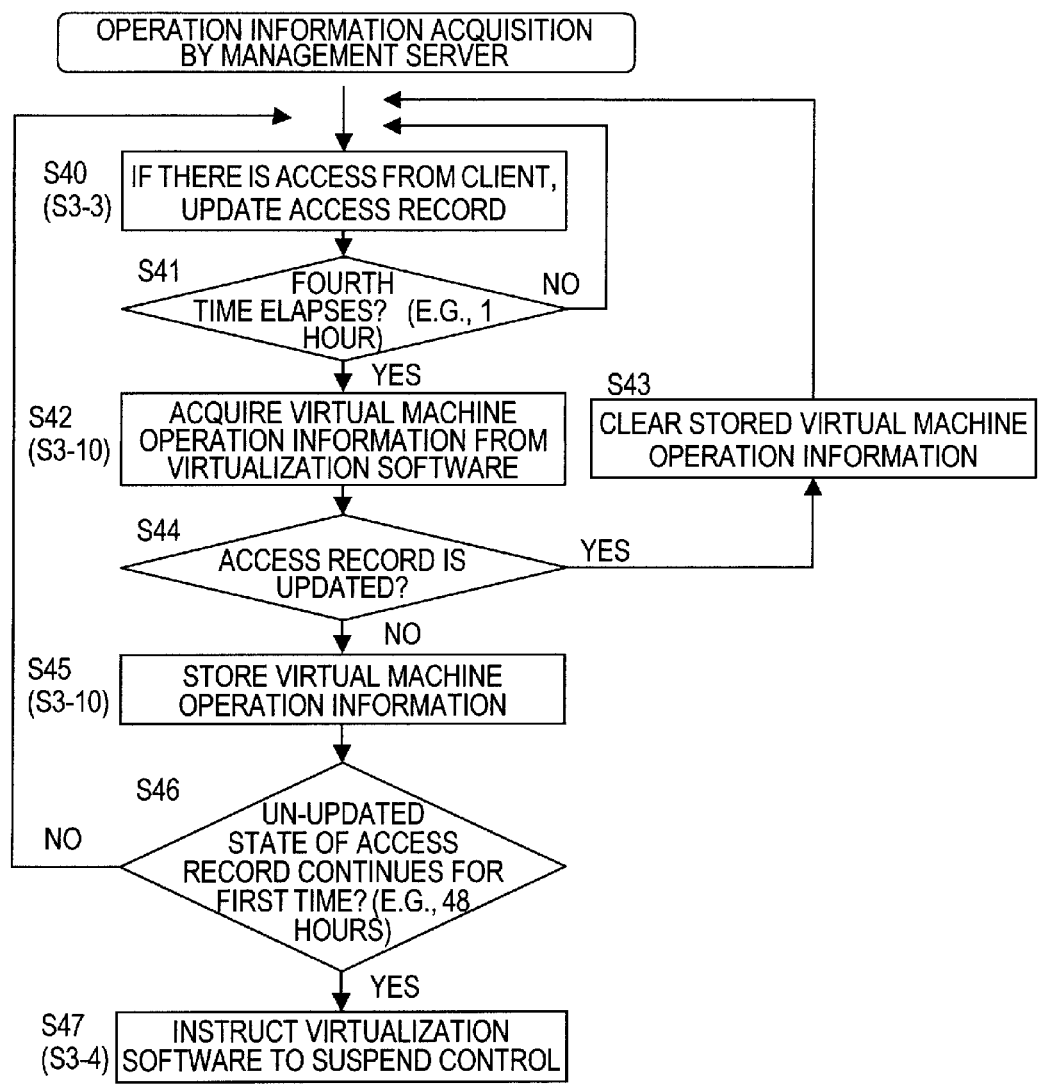
FIG. 14 is a more specific flowchart of the action information acquisition by the management server.

FIG. 13 is a diagram depicting operation Information acquisition from the virtual machine by the management server. FIG. 14 is a more specific flowchart of the action information acquisition by the management server. FIG. 14 includes access management and suspend control by the management server.

As depicted in FIG. 13, the virtualization software 4 collects operation information of the virtual machine VM and periodically notifies the management server 3 of the operation information (S4-2). The management server 3 periodically receives the operation Information of the virtual machine VM from the virtualization software 4 and stores the operation information (S3-10).

As depicted in FIG. 14, the management server 3 monitors an access from the client terminal 6 to the virtual machine VM in the started state and, if there is an access, updates an access record (S40 and S3-3). The access monitoring by the management server 3 is as explained with reference to FIG. 10. Every time a fourth time (e.g., one hour) elapses (YES in S41), the management server 3 acquires operation information of the virtual machine VM from the virtualization software 4 (S42 and S3-10). That is, step S3-10 in FIG. 13 corresponds to the periodic acquisition of operation information of the virtual machine VM. A periodic interval of the acquisition of operation information corresponds to the fourth time.

When the operation information is acquired, if the access record in step S40 is an update due to occurrence of an access (YES in S44), the management server 3 clears (discards) the acquired operation information (S43). This is because, since the management server 3 extracts a timing and an operation time of the refresh operation by the virtual machine VM from the operation information of the virtual machine VM, it is desirable to include, in the operation information, only a history of an operation starting from a voluntary output operation to the outside by the virtual machine VM involved in the refresh operation. That is, it is desirable to exclude an operation history of an access from the client and an access response to the access and include only an operation starting from a voluntary output operation to the outside, which is not a response to the access from the client.

Examples of the refresh operation are periodic alive notification, periodic virus pattern update, update of software, and like, which are access operations to the outside periodically executed by the OS of the virtual machine VM while staying on standby according to the timer.

When an access does not occur while the fourth time elapses, the management server 3 records the acquired operation information of the virtual machine VM (S45 and S3-10). When an un-updated state of an access record (no access) continues for the first time (e.g., forty-eight hours) (YES in S46), the management server 3 executes suspend control for giving a suspension instruction to the virtualization software 4 (S47 and S3-4). If the access record is updated within forty-eight hours (NO in S46), the management server 3 clears already-stored operation information of the virtual machine VM (S43).

Consequently, when an access to the virtual machine VM does not continuously occur for forty-eight hours, the management server 3 retains the operation information of the virtual machine VM acquired for forty-eight hours and subjects the virtual machine VM in which an access does not occur to the suspend control. Consequently, the management server 3 acquires, as the operation information, a history of the refresh operation of the virtual machine VM immediately before being suspended.

FIG. 20 is a diagram depicting an example of an operation information table of the virtual machines VM. The operation information table is a history of the number of counts of an IO operation and an IO continuation time in total of all number of IO counts in every one hour concerning three virtual machines VM001, VM002, and VM003. In the case of the virtual machine VM001, one hour of 00:00 to 01:00 and one hour of 01:00 to 02:00 include a history of the number of 10 counts of 150 and the IO continuation time of five minutes and the number of 10 counts of 500 and the IO continuation time of ten minutes.

Therefore, from the operation history, the management server 3 detects that if the management server 3 subjects the suspended virtual machine VM001 to the resume control and the suspend control for five minutes of 00:55 to 01:00 and ten minutes of 01:50 to 02:00, the management server 3 can cause the virtual machine VM001 to perform the refresh operation in the temporary resume state. Similarly, from the operation history, the management server 3 detects that the management server 3 only has to subject the suspended virtual machine VM002 to the resume control and the suspend control in twenty minutes of 09:40 to 10:00.

Figure 15:
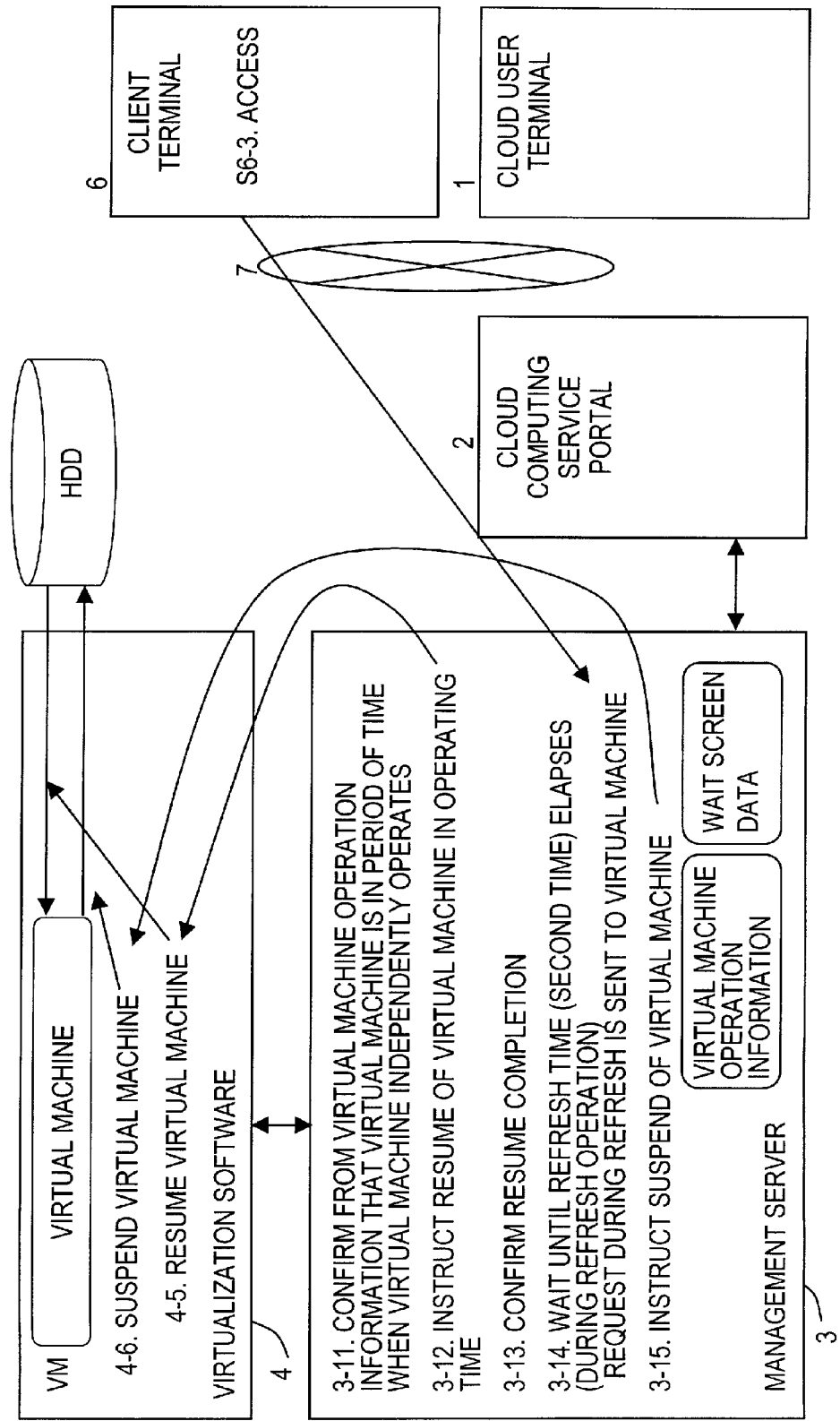
FIG. 15 is a diagram depicting a periodic refresh operation of the suspended virtual machine.

FIG. 15 is a diagram depicting a periodic refresh operation of the suspended virtual machine. An example depicted in FIG. 15 is an example in which timing for the refresh operation is set to the optimum timing extracted from the operation history of the virtual machine. However, the refresh operation of the virtual machine may be simply periodically executed without depending on the operation history.

The management server 3 confirms on the basis of the operation information of the virtual machine VM that the virtual machine VM is in a period of time when the virtual machine VM independently operates (S3-11). The management server 3 instructs the virtualization software 4 to resume the virtual machine VM in time when the virtual machine VM independently operates (S3-12). In response to the instruction, the virtualization software 4 resumes the virtual machine VM (S4-5).

When the management server 3 confirms from the virtualization software 4 that the resume is completed (S3-13), the management server 3 stays on standby until a refresh operation time by the virtual machine VM (a second time) elapses (S3-14). Desirably, when an access from the client terminal 6 occurs while the virtual machine VM is temporarily in the resume state (S6-3), the management server 3 transmits the access to the virtual machine VM and causes the virtual machine VM to perform access processing (S3-14) without suspending.

After the time taken for the refresh operation (the second time) elapses, the management server 3 instructs the virtualization software 4 to suspend the virtual machine VM (S3-15). In response to the instruction, the virtualization software 4 suspends the virtual machine VM (S4-6).

Figure 16:
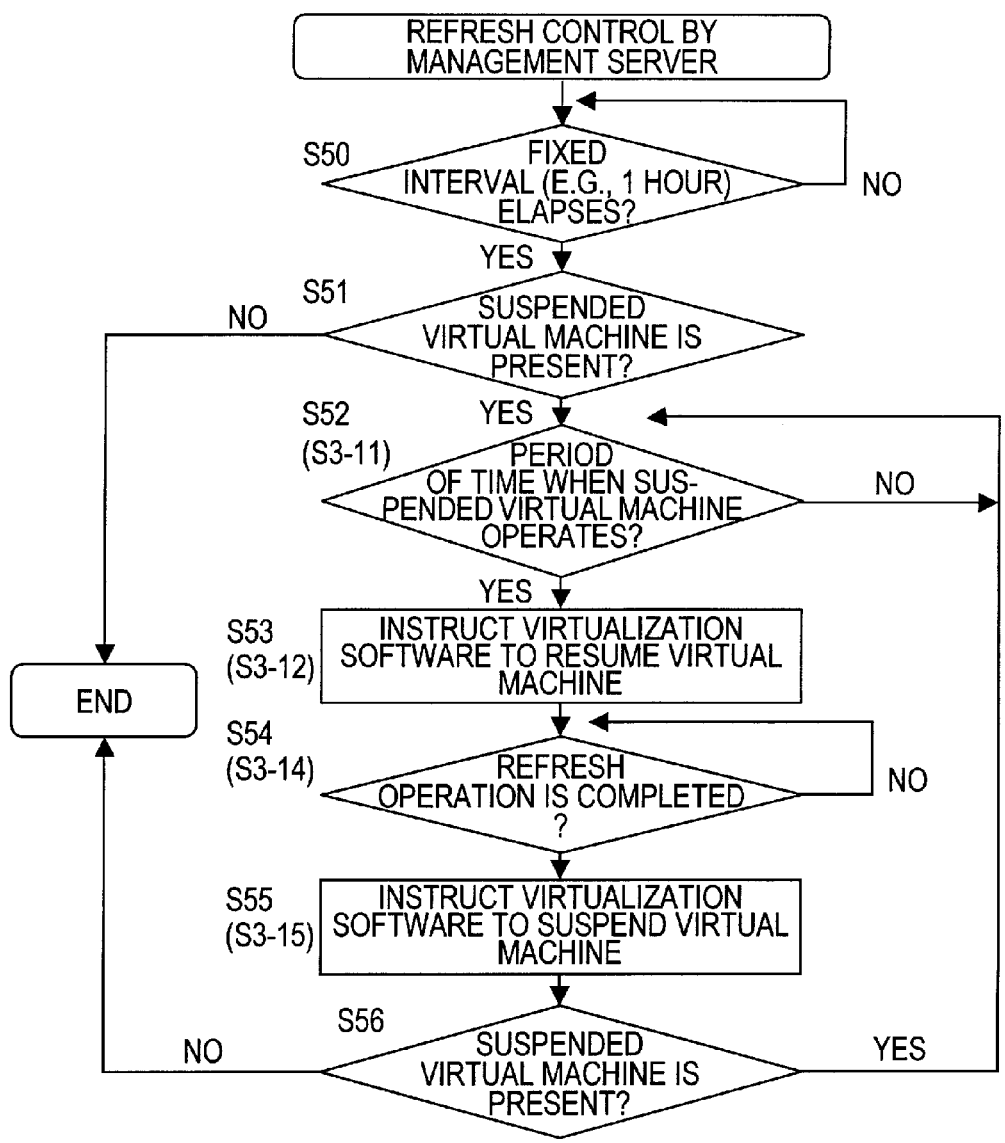
FIG. 16 is a flowchart of control of the refresh operation of the virtual machine by the management server.

FIG. 16 is a flowchart of control of the refresh operation of the virtual machine by the management server. In FIG. 16, steps same as the steps in FIG. 15 are denoted by the same step numbers in parentheses.

According to operation Information concerning the refresh operation of the virtual machine VM depicted in FIG. 20, the management server 3 temporarily resumes the suspended virtual machine VM for an IO access continuation time that occurred in the past in every one hour. Therefore, every time a fixed interval (e.g., one hour) elapses (YES in S50), the management server 3 executes control for temporarily sets the suspended virtual machine VM to the resume state indicated by steps S51 to S56.

If the suspended virtual machine VM is present (YES in S51), when a period of time when the suspended virtual machine VM independently operates comes (S52 and S3-11), the management server 3 instructs the virtualization software 4 to resume the virtual machine VM (S53 and S3-12). In response to the instruction, the virtual machine VM is resumed and changes to the resume state. Then, the virtual machine VM independently starts the refresh operation according to the timer management in the OS. The management server 3 waits for completion of the refresh operation (S54 and S3-14) and instructs the virtualization software 4 to suspend the virtual machine VM (S55 and S3-15).

The management server 3 applies the processing in S52 to S55 to all the suspended virtual machines VM (S56).

As depicted in FIGS. 15 and 16, in the automatic meter rate charging in this embodiment, the management server 3 suspends the un-accessed virtual machine VM, periodically resumes the virtual machine VM during the suspension, and causes the virtual machine VM to execute the refresh operation. Therefore, when the management server 3 subjects the suspended virtual machine VM to the resume control in response to the access from the client terminal 6 later, since the refresh operation held during the suspension is absent in the virtual machine VM, it is possible to complete the resume processing in a short time and return an access response in a short time.

Figure 17:
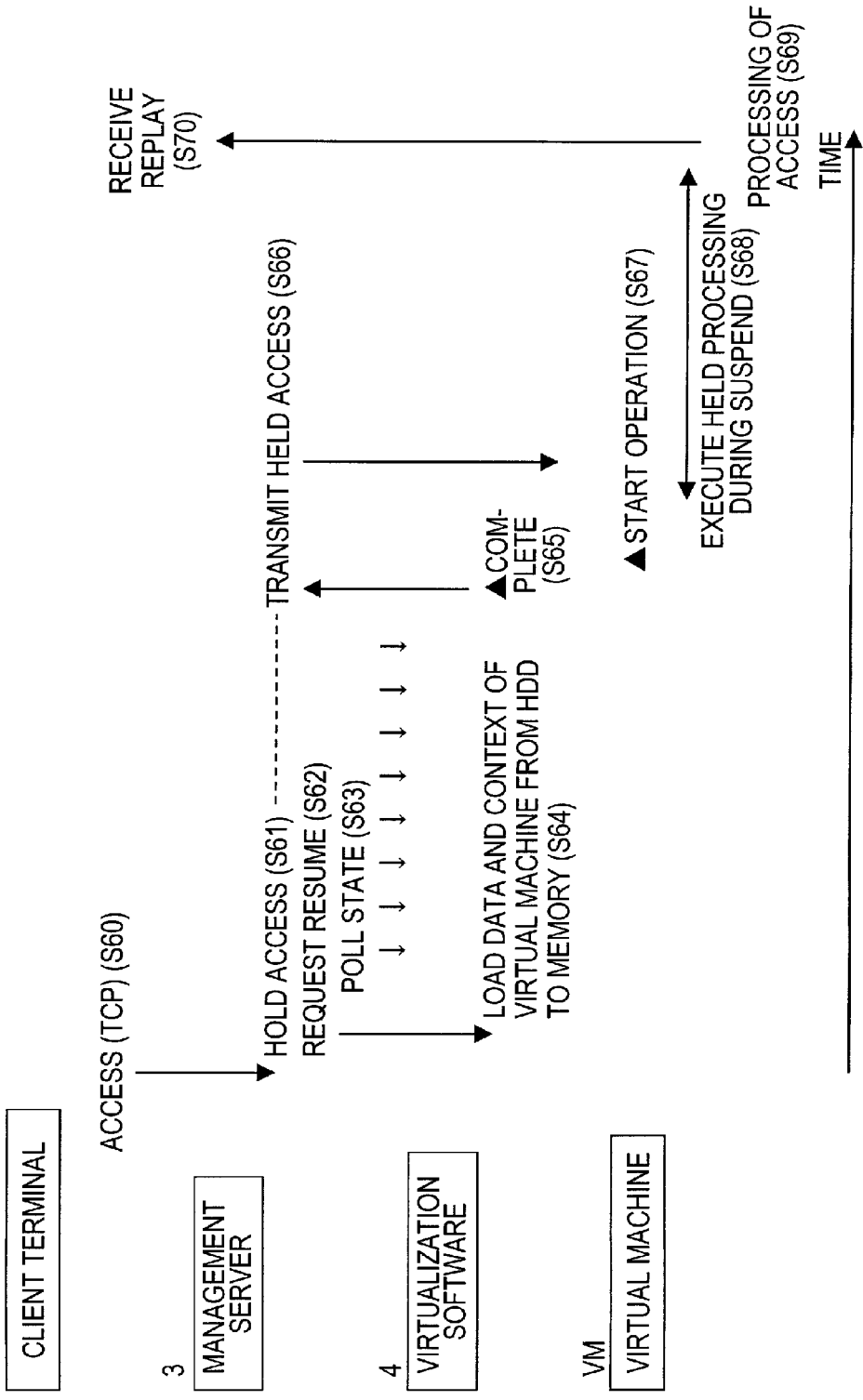
FIG. 17 is a diagram depicting a normal resume operation.

FIG. 17 is a diagram depicting a normal resume operation. On the other hand, FIG. 18 is a diagram depicting the resume operation of the virtual machine charged by the automatic meter rate charging in this embodiment.

Figure 18:
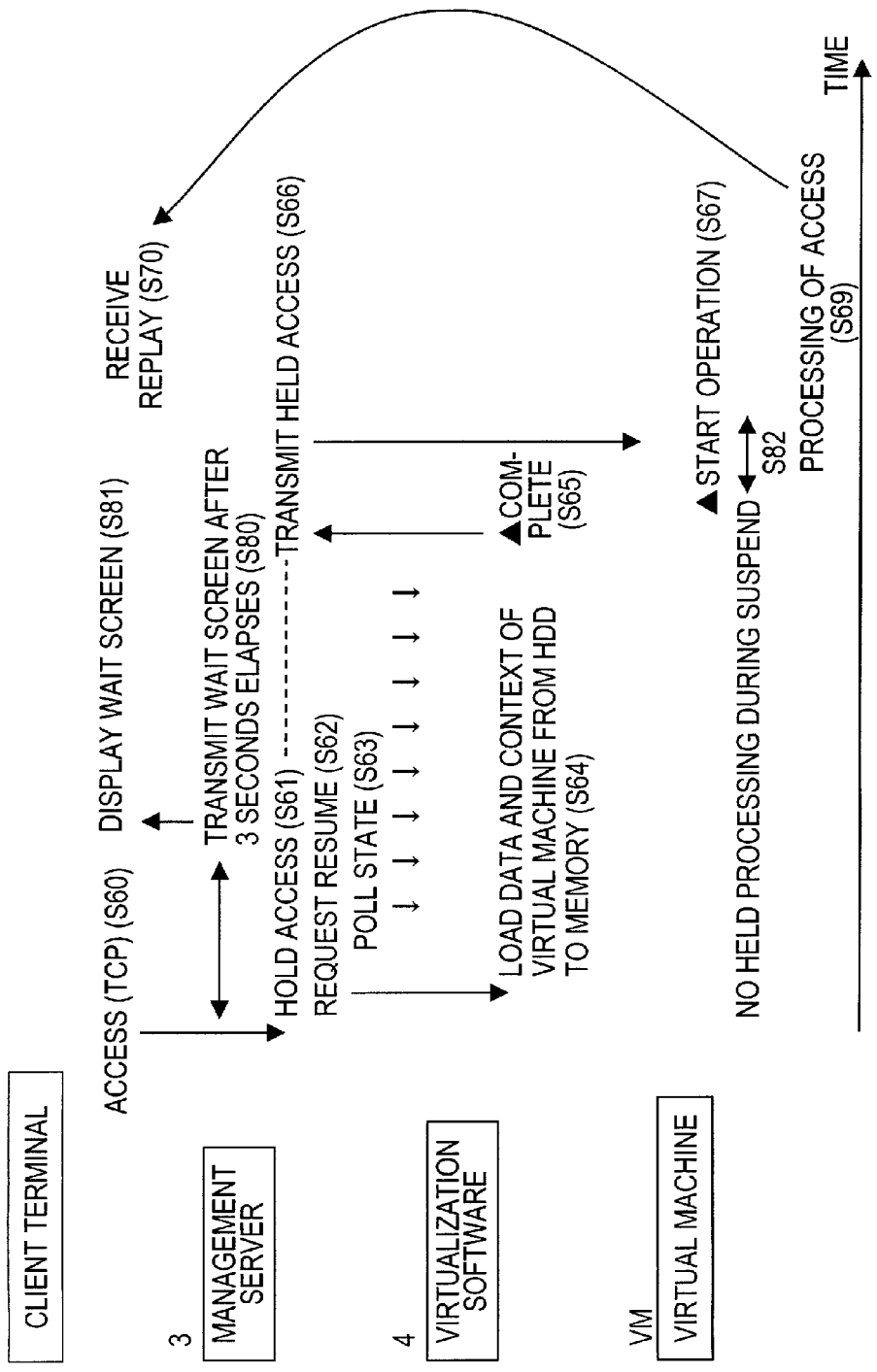
FIG. 18 is a diagram depicting the resume operation of the virtual machine charged by the automatic meter rate charging in this embodiment.

In FIGS. 17 and 18, processing by the client terminal 6, the management server 3, the virtualization software 4, and the virtual machine VM are depicted with respect to a time axis of the abscissa.

In the case of the normal resume operation depicted in FIG. 17, an access to the suspended virtual machine VM by the client terminal 6 occurs (S60). The management server 3 once holds the access (S61) and requests the virtualization software 4 to resume the virtual machine VM (S62). In response to the request, the virtualization software 4 resumes the virtual machine VM (S64). Specifically, the virtualization software 4 loads data and a context of the virtual machine VM from the hard disk HDD and writes the data and the context in the memory and CPU (S64). The management server 3 periodically polls, for example, a state of the virtual machine VM that the management server 3 instructs the virtualization software 4 to resume (S63). When the management server 3 detects that the resume is completed (S65), the management server 3 transmits the held access to the virtual machine VM (S66).

However, when the resume operation is completed (S65) and the virtual machine VM starts an operation (S67), the virtual machine VM starts to execute, all at once, refresh operations held during the suspension (S68). Therefore, the virtual machine VM cannot start processing of the transmitted access. As a result, the virtual machine VM performs processing of the access only after the refresh operation is completed (S69) and responds to the access from the client terminal 6 (S70). In this way, an access response time is long.

In the case of the resume operation for the virtual machine charged by the automatic meter rate charging in this embodiment depicted in FIG. 18, an operation is performed as explained below. Steps S60 to S70 are the same as steps S60 to S70 explained above except step S68. The virtual machine VM charged by the automatic meter rate charging periodically performs the refresh operation during suspension. Therefore, in the resume of the virtual machine VM performed in response to the access from the client terminal 6, when the resume processing is completed and the virtual machine VM starts an operation (S67), the refresh operation held during the stop is absent. Therefore, it is possible to start processing of the held access (S69) in a shortest time after the operation start (S82).

In the case of the resume operation for the virtual machine VM charged by the automatic meter rate charging, when the resume takes time, the management server 3 transmits the wait screen data to the client terminal 6 (S80) and causes the client terminal 6 to display the wait screen (S81). That is, when the resume processing performed by the virtualization software 4 in response to the access from the client terminal 6 takes time, the wait screen is transmitted to the client terminal 6. Therefore, it is possible to prevent the client from noticing that the virtual machine VM is being resumed.

As explained above, according to this embodiment, the cloud computing service provider may release, during the suspension of the virtual machine, the hardware resources allocated to the virtual machine under the contract by the automatic meter rate charging and allocate the hardware resources to the other virtual machines. Therefore, it is possible to realize effective use of the hardware. The cloud user generates an always-accessible Web server or the like with the automatic meter rate charging less expensive than the conventional monthly charging. Moreover, when an access to a service provided by the virtual machine is absent, the virtual machine is automatically subjected to the suspend control by the cloud computing service provider. When an access occurs, the virtual machine is automatically subjected to the resume control. Therefore, the cloud user is released from troublesome operation of the virtual machine. Moreover, since the resume is completed in a short time, it is possible to suppress a delay in a response to the access.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the Invention. Although one or more embodiments of the present invention have been described in detail, it should be understood that the various changes, substitutions, and alterations could be made hereto without departing from the spirit and scope of the invention.

What is claimed is:

1. A non-transitory computer readable medium that stores therein a virtual machine management program for causing a computer to execute a process comprising:
    suspending a virtual machine, when an access to the virtual machine does not occur for a first time;
    resuming the virtual machine being suspended, when the access to the virtual machine occurs; and
    between the suspending the virtual machine and the resuming the virtual machine being suspended,
    temporarily resuming the virtual machine being suspended, even if the access to the virtual machine does not occur, to cause the virtual machine to perform a refreshing process, and
    thereafter suspending the virtual machine being temporarily resumed after a second time elapses since the temporarily resuming; and
    acquiring operation information including an independent output access by the virtual machine.

2. The non-transitory computer readable medium according to claim 1, wherein, in process of the suspending, releasing a hardware allocated to the virtual machine being suspended.

3. The non-transitory computer readable medium according to claim 1, further comprising:
    setting a timing of the temporarily resuming and thereafter suspending according to a timing of the independent output access of the operation information.

4. The non-transitory computer readable medium according to claim 3, wherein the independent output access by the virtual machine includes an output access by the virtual machine while the access to the virtual machine does not occur.

5. The non-transitory computer readable medium according to claim 4, wherein the independent output access by the virtual machine includes an output access involved in a refresh operation including update processing for a virus pattern or alive notification processing.

6. The non-transitory computer readable medium according to claim 1, wherein, the second time is longer than a time for the refreshing process.

7. The non-transitory computer readable medium according to claim 1, wherein, in process of the resuming, when the resuming takes more than a third time, causing a client terminal accessing the virtual machine to display an access response screen for displaying access-processing-in-progress.

8. The non-transitory computer readable medium according to claim 1, wherein, in process of the temporarily resuming and thereafter suspending, when an access to the virtual machine occurs during the refreshing process, causing the virtual machine in the refreshing process to execute a response processing to the access.

9. The non-transitory computer readable medium according to claim 1, the process further comprising; temporarily holding the access to the virtual machine being suspended while the virtual machine is being suspended and, after the process of the resuming the virtual machine is completed, transmitting the held access to the virtual machine being resumed.

10. A virtual machine management apparatus that manages a virtual machine generated in hardware, comprising:
    a suspending unit configured to
    suspend the virtual machine, when an access to the virtual machine does not occur for a first time;
    a resuming unit configured to resume the virtual machine being suspended, when the access to the virtual machine being suspended occurs and a refreshing unit configured to,
    between the suspending the virtual machine and the resuming the virtual machine being suspended,
    temporarily resume the virtual machine being suspended, even if the access to the virtual machine does not occur, to cause the virtual machine to perform a refreshing process, and
    thereafter suspend the virtual machine being temporarily resumed after a second time elapses since the temporarily resuming; and
    an operation information acquiring unit configured to acquire operation information including an independent output access by the virtual machine.

11. The virtual machine management apparatus according to claim 10, further comprising:
    a setting unit configured to set a timing when the refreshing unit temporarily resumes and thereafter suspends the virtual machine being temporarily resumed, according to a timing of the independent output access of the operation information.

12. A cloud computing system comprising:
    a virtual machine generated in hardware including at least a server; and
    a virtual machine management apparatus that manages the virtual machine, wherein
    the virtual machine management apparatus includes:
    a suspending unit configured to suspend the virtual machine, when an access to the virtual machine does not occur for a first time;

a resuming unit configured to resume the virtual machine being suspended, when the access to the virtual machine being suspended occurs and a refreshing unit configured to, between the suspending the virtual machine and the resuming the virtual machine being suspended, temporarily resume the virtual machine being suspended, even if the access to the virtual machine does not occur, to cause the virtual machine to perform a refreshing process, and thereafter suspend the virtual machine being temporarily resumed after a second time elapses since the temporarily resuming; and acquiring operation information including an independent output access by the virtual machine.

13. The cloud computing system according to claim 12, wherein the virtual machine management apparatus further includes:

an operation information acquiring unit configured to acquire operation information including an independent output access by the virtual machine, and a setting unit configured to set a timing when the refreshing unit temporarily resumes and thereafter suspends the virtual machine being temporarily resumed, according to a timing of the independent output access of the operation information.

14. A non-transitory computer readable medium that stores therein a virtual machine management program for causing a computer to execute a process comprising:

suspending a virtual machine, when an operation request to the virtual machine does not occur for a first time;

resuming the virtual machine being suspended, when the operation request to the virtual machine occurs; and between the suspending the virtual machine and the resuming the virtual machine being suspended, temporarily resuming the virtual machine being suspended, even if the access to the virtual machine does not occur, to cause the virtual machine to perform a refreshing process, and thereafter suspending the virtual machine being temporarily resumed after a second time elapses since the temporarily resuming; and acquiring operation information including an independent output access by the virtual machine.

* * * * *